US 10,395,644 B2

(12) United States Patent
Hayashida et al.

(10) Patent No.: US 10,395,644 B2
(45) Date of Patent: Aug. 27, 2019

(54) SPEECH RECOGNITION METHOD, SPEECH RECOGNITION APPARATUS, AND NON-TRANSITORY COMPUTER-READABLE RECORDING MEDIUM STORING A PROGRAM

(71) Applicant: Panasonic Corporation, Osaka (JP)

(72) Inventors: Kohhei Hayashida, Kyoto (JP); Tsuyoki Nishikawa, Osaka (JP)

(73) Assignee: PANASONIC CORPORATION, Osaka (JP)

( * ) Notice: Subject to any disclaimer, the term of this patent is extended or adjusted under 35 U.S.C. 154(b) by 1 day.

(21) Appl. No.: 15/430,690

(22) Filed: Feb. 13, 2017

(65) Prior Publication Data

US 2017/0249936 A1 Aug. 31, 2017

Related U.S. Application Data

(60) Provisional application No. 62/299,852, filed on Feb. 25, 2016.

(30) Foreign Application Priority Data

Nov. 11, 2016 (JP) .................................. 2016-220943

(51) Int. Cl.
*G10L 15/04* (2013.01)
*G10L 15/28* (2013.01)
(Continued)

(52) U.S. Cl.
CPC ............. *G10L 15/04* (2013.01); *G10L 15/28* (2013.01); *G10L 2021/02166* (2013.01); *H04R 3/005* (2013.01)

(58) Field of Classification Search
CPC ................. G10L 15/04; G10L 15/28; G10L 2021/02166; H04R 3/005
(Continued)

(56) References Cited

U.S. PATENT DOCUMENTS

2003/0200083 A1* 10/2003 Serizawa .............. G10L 19/005
704/219
2009/0316923 A1* 12/2009 Tashev .................. H04M 9/082
381/66
2016/0111113 A1* 4/2016 Cho .................... G10L 21/0208
704/250

FOREIGN PATENT DOCUMENTS

JP          7-336790         12/1995

* cited by examiner

*Primary Examiner* — Bharatkumar S Shah
(74) *Attorney, Agent, or Firm* — Greenblum & Bernstein, P.L.C.

(57) ABSTRACT

A speech recognition method acquires sound information via multiple microphones, detects a sound source interval including sound from the sound information, acquires an estimated direction of speech by conducting direction estimation on a speech interval from among the sound source interval, conducts an adaptation process of using the sound information to estimate filter coefficients, decides a buffer size of the sound information to hold in a buffer, based on sound source interval information, estimated direction information, and adaptation process convergence state information, holds the sound information in the buffer according to the buffer size, conducts a beamforming process using the sound information held in the buffer and the filter coefficients to acquire speech information, and conducts speech recognition on the speech information acquired by the beamforming process. The method decides the buffer size to be a size sufficient for convergence of the adaptation process immediately after sound information processing starts.

9 Claims, 13 Drawing Sheets

(51) Int. Cl.
*G10L 21/0216* (2013.01)
*H04R 3/00* (2006.01)

(58) Field of Classification Search
USPC .......................................................... 704/253
See application file for complete search history.

FIG. 8

| ESTIMATED DIRECTION | ADAPTATION PROCESS CONVERGENCE STATE | TYPE OF SOUND SOURCE INTERVAL | BUFFER SIZE |
|---|---|---|---|
| CHANGED | NON-CONVERGENCE | SPEECH | MAXIMUM |
| CHANGED | NON-CONVERGENCE | NON-SPEECH | MAXIMUM |
| CHANGED | CONVERGENCE | SPEECH | MAXIMUM |
| CHANGED | CONVERGENCE | NON-SPEECH | MAXIMUM |
| CONSTANT | NON-CONVERGENCE | SPEECH | NO CHANGE |
| CONSTANT | NON-CONVERGENCE | NON-SPEECH | NO CHANGE |
| CONSTANT | CONVERGENCE | SPEECH | NO CHANGE |
| CONSTANT | CONVERGENCE | NON-SPEECH | DECREASE |

SPEECH RECOGNITION METHOD, SPEECH RECOGNITION APPARATUS, AND NON-TRANSITORY COMPUTER-READABLE RECORDING MEDIUM STORING A PROGRAM

BACKGROUND

1. Technical Field

The present disclosure relates to a speech recognition method, a speech recognition apparatus, and a non-transitory computer-readable recording medium storing a program.

2. Description of the Related Art

Technology that uses a sound pickup device such as a microphone to recognize a specific speech signal, or in other words, speech recognition technology, has been proposed. For example, Japanese Unexamined Patent Application Publication No. 7-336790 discloses a microphone system that uses multiple directional microphones in a sound field where multiple speakers are present to pick up a specific speech signal. In the microphone system described in Japanese Unexamined Patent Application Publication No. 7-336790, each microphone is disposed toward a speaker. Furthermore, from among the speech signals from the respective microphones, the speech signal having a speech signal level that exceeds the noise level in the silent state the earliest is selected and output.

The microphone system described in Japanese Unexamined Patent Application Publication No. 7-336790 is provided with a delay element that delays the speech signal to reduce the loss of the start of speech, in which the beginning of a word goes missing due to the speech signal processing time. The speech signals from the multiple microphones are selected for output after being amplified by an amp and passing through the delay element.

In addition, the amount of delay is taken to be the maximum amount of delay from among the amounts of delay due to various speech signal processing elements in the microphone system.

SUMMARY

In one general aspect, the techniques disclosed here feature a speech recognition method that recognizes speech from sound information acquired by a plurality of microphones, including: (a1) acquiring sound information via the plurality of microphones; (a2) detecting a sound source interval including sound from the acquired sound information; (a3) acquiring an estimated direction of speech by conducting direction estimation on a speech interval from among the detected sound source interval; (a4) conducting an adaptation process that uses the acquired sound information to estimate filter coefficients for extracting speech information in the estimated direction; (a5) deciding a buffer size of the sound information to hold in a buffer, based on information about the sound source interval, information about the estimated direction, and information about a convergence state of the adaptation process; (a6) holding the acquired sound information in the buffer according to the decided buffer size; (a7) conducting a beamforming process using the sound information held in the buffer and the filter coefficients estimated by the adaptation process, and acquiring speech information; and (a8) conducting speech recognition on the speech information acquired by the beamforming process, wherein in the deciding (a5), immediately after processing of the acquired sound information starts, a buffer size of a size sufficient for the convergence of the adaptation process is decided as the buffer size to hold in the buffer.

According to a speech recognition method according to the present disclosure, it is possible to improve speech recognition response while also reducing the loss of the start of speech.

It should be noted that general or specific embodiments of the above configuration may be implemented as an apparatus, method, integrated circuit, computer program, or non-transitory computer-readable recording medium such as a CD-ROM disc, or by an arbitrary combination of a system, apparatus, method, integrated circuit, computer program, and recording medium.

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

BRIEF DESCRIPTION OF THE DRAWINGS

FIG. 8 is a diagram illustrating an example of a list of each case for the buffer size decided by the process in FIG. 7;

DETAILED DESCRIPTION

[Findings by Inventors]

Figure 1:
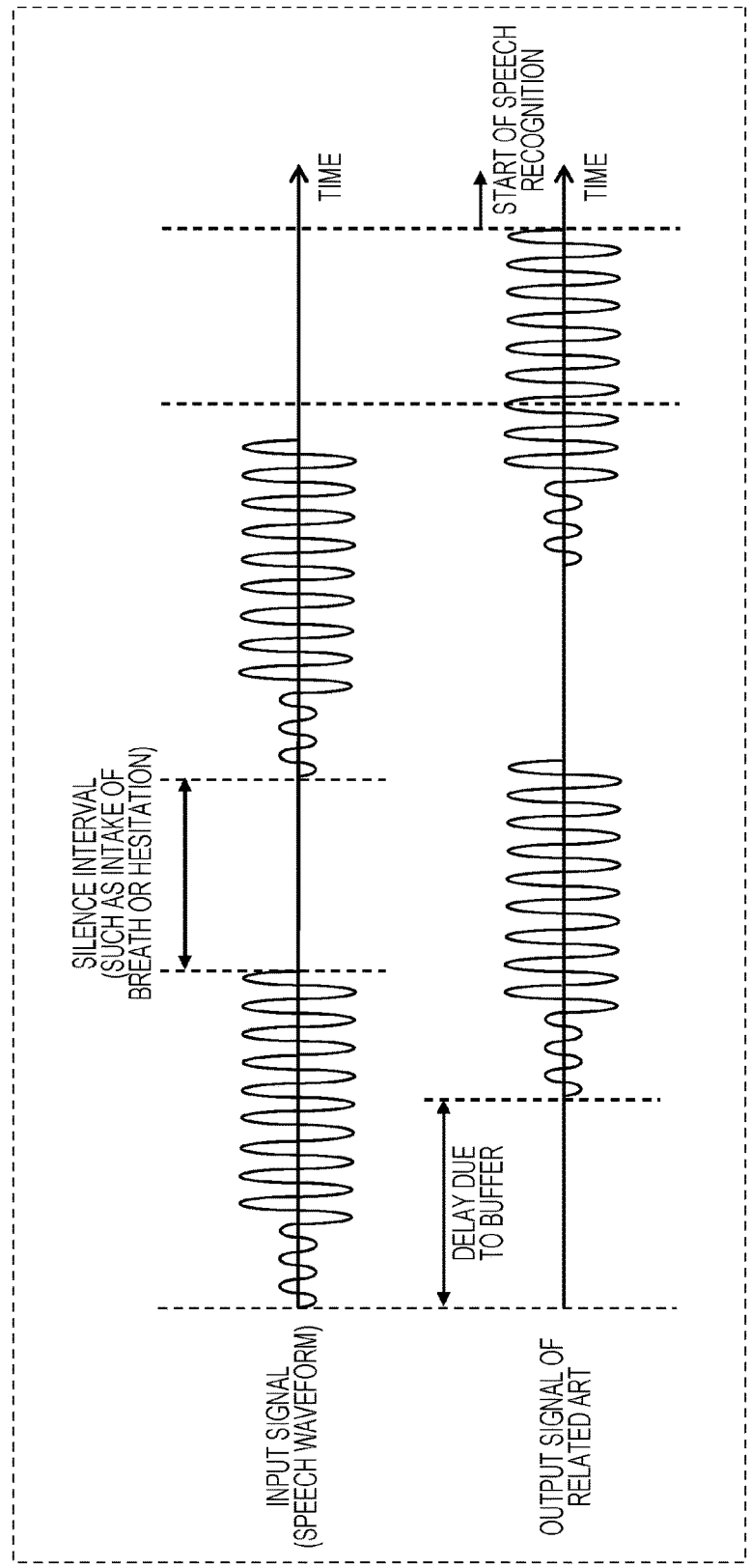
FIG. 1 is a diagram illustrating a relationship between a speech waveform input into a microphone, and a waveform of a signal output by a speech recognition method of the related art.

The inventors involved in the present disclosure, or in other words the present inventors, investigated speech recognition technology, and found the following. For example, in some cases, speech recognition technology is applied to an environment in which speakers are anticipated to exist in various directions, such as with speech recognition technology for a speech interface in an interactive robot. With such speech recognition technology, to recognize speech with high accuracy even in a noisy environment, it is necessary to extract at high quality speech spoken by speakers from various directions.

Technologies for this purpose include technology that uses multiple microphones to estimate a speaker direction based on arrival time differences of sound waves, and microphone array technology such as a beamformer that enhances a sound source in an arbitrary direction by controlling the directionality of the sound pickup area.

For a beamformer, there is a method of forming a beam in a desired direction by using a fixed filter in which predetermined filter coefficients are set, and a method of forming a beam in a desired direction by using an adaptive filter in which filter coefficients are estimated successively by an adaptation process using an observed signal, and forming a beam blind spot in an unwanted noise direction.

Herein, the adaptation process is a process of estimating filter coefficients by recursive calculation so that the signal obtained as a result of processing the observed signal with the filter becomes a desired signal. In the adaptation process, if the parameters of sound sources such as noise and a desired sound source change over time, the filter coefficients vary greatly every time the filter coefficients are estimated by the adaptation process, and approach a different optimal value for each sound source parameter. Meanwhile, if the parameters of sound sources such as noise and a desired sound source do not change, the variation in the filter coefficients decreases slightly every time the filter coefficients are estimated by the adaptation process, and converge on an optimal value. In this way, the adaptation process converges as a result of the filter coefficients approaching or converging on an optimal value.

With speech enhancement by a beamformer using an adaptive filter, at the start of speech when utterance is unstable immediately after the speaker direction changes, the filter coefficients do not converge adequately, and because filter coefficients optimal for enhancing the speaker's speech have not been estimated, a loss of the start of speech, in which the beginning of an utterance cannot be picked up, may occur in some cases.

Since the parameters of sound sources such as speakers and noise ordinarily change over time, when implementing a method of computing and holding filter coefficients in advance, it is necessary to account for all sound source directions and combinations thereof. For this reason, a buffer of extremely large size is needed to hold the filter coefficients, which is not realistic.

Accordingly, the technology of the related art uses a buffer to hold sound information acquired by a microphone. If the size of the buffer is large enough for the adaptation process to converge in the beamformer, by having the beamformer process the sound information held in the buffer after convergence of the adaptation process, high-quality speech with no loss of the start of speech may be obtained, and speech recognition with little misrecognition may be realized.

However, since the process by the beamformer is conducted after holding sound information acquired by a microphone in the buffer, a delay is produced until the sound information acquired by the microphone is processed by the beamformer. Specifically, this delay is a delay equal to the time over which the beamformer processes the sound information held in the buffer. Referring to FIG. 1, there is illustrated the relationship of the delay between a speech waveform which is the input signal of a microphone, and the waveform of an output signal from a process using a buffer according to the technology of the related art. As illustrated in FIG. 1, before the result of speech recognition is obtained, a delay equal to the time over which the beamformer processes the sound information held in the buffer is always required, and thus there is a problem in that the response of the speech recognition becomes slow. To address the above issue of the related art, the inventors investigated technology with high speech recognition performance and fast speech recognition response, even in cases in which the speaker direction changes diversely.

Additionally, to address the above issue, the inventors discovered increasing and decreasing the buffer size to use for the speech enhancement process by the beamformer, based on the direction of speech, the convergence state of the adaptation process, and information about the sound source interval. Specifically, for example, immediately after a change in the direction of speech, such as the speaker direction, the buffer size is increased regardless of the convergence state of the adaptation process and the information about the sound source interval, and filter coefficients to use in the process by the beamformer are computed using a buffer of sufficient size for convergence of the adaptation process. Also, if the direction of speech, such as the speaker direction, is constant, it is decided whether or not to decrease the buffer size, based on the convergence state of the adaptation process and the information about the sound source interval. Subsequently, by decreasing the buffer size to use for the adaptation process, the real-time performance of the adaptation process improves. For example, if the adaptation process converges, and a silence interval such as an intake of breath, a hesitation, or a break in an utterance is detected, the speech enhancement process by the beamformer is not conducted on the sound information of the detected silence interval, and in addition, the buffer size to be used in the processing of the silence interval and after the silence interval is decreased. According to a configuration as discussed above, it is possible to increase or decrease the buffer size to use in the process by the beamformer, according to the direction of speech and the convergence state of the adaptation process.

Consequently, the inventors discovered that by using a buffer of sufficient size for the adaptation process immediately after the direction of speech changes, it is possible to obtain high-quality speech with no loss of the start of speech. The present disclosure provides a speech recognition method, a speech recognition apparatus, and a non-transitory computer-readable recording medium storing a program, which improve the response of speech recognition while also minimizing the loss of the start of speech. Furthermore, the inventors discovered that if the direction of speech is constant, it is possible to speed up speech recognition response by omitting the speech enhancement process on a silence interval and also decreasing the buffer size to use in the processing of the silence interval and after the silence interval. Thus, the inventors discovered that speech recognition with high speech recognition performance and fast response is possible, even when the direction of speech changes diversely.

Hereinafter, exemplary embodiments disclosed by the inventors on the basis of the above findings will be described specifically and with reference to the drawings. Note that the exemplary embodiments described hereinafter all illustrate general or specific examples. Features such as numerical values, shapes, materials, structural elements, layout positions and connection states of structural elements, processes, and the ordering of processes indicated in the following exemplary embodiments are merely examples, and are not intended to limit the present disclosure. In addition, among the structural elements in the following exemplary embodiments, structural elements that are not described in the independent claim indicating the broadest concept are described as arbitrary or optional structural elements. Also, ordinal numbers such as first, second, and third may be prepended appropriately to structural elements and the like for the sake of expression.

Also, in the following description of the exemplary embodiments, expressions using the term "approximately", such as approximately parallel or approximately orthogonal, may be used in some cases. For example, the phrase approximately parallel not only means an absolutely parallel state, but also a substantially parallel state, or in other words, allows for disparity on the order of a few percent, for example. Other expressions using the term "approximately" are similar. Also, the drawings are diagrammatic views, and are not necessarily drawn strictly. Furthermore, in the drawings, structural elements that are substantially the same are denoted with the same signs, and duplicate description of such structural elements may be reduced or omitted in some cases.

Embodiment 1

[Configuration of Speech Recognition Apparatus]

Figure 2:
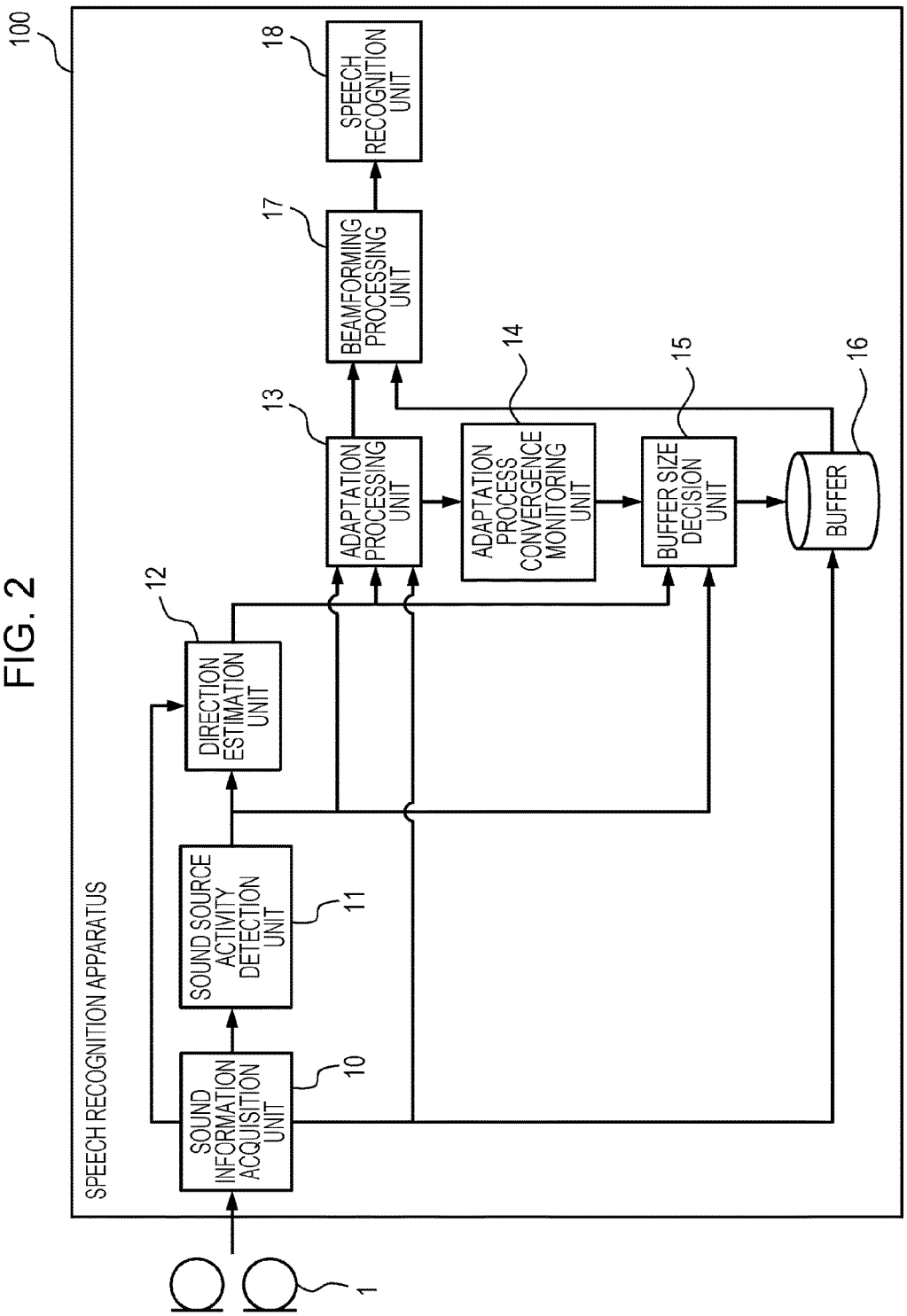
FIG. 2 is a block diagram illustrating a schematic configuration of a speech recognition apparatus according to Embodiment 1.

A configuration of a speech recognition apparatus 100 according to Embodiment 1 will be described with reference to FIG. 2. FIG. 2 is a block diagram illustrating a schematic configuration of the speech recognition apparatus 100 according to Embodiment 1. The speech recognition apparatus 100 is connected to multiple microphones 1, and is configured to receive an electrical signal generated as a result of the multiple microphones 1 picking up sound. The microphones 1 acquire sound information about picked-up sound as an electrical signal. In the following, an electrical signal generated by microphones 1 is also called an observed signal or a sound signal. The multiple microphones 1 are arranged so that at least one of the disposed positions and sound pickup directions are different from each other. For example, the multiple arranged microphones 1 may constitute a microphone array.

The speech recognition apparatus 100 recognizes specific sound, such as speech, by using the sound information acquired via the multiple microphones 1. The speech recognition apparatus 100 may constitute a single system together with the multiple microphones 1, or may constitute a single apparatus by itself. Alternatively, the speech recognition apparatus 100 may be built in as hardware or as software into an information processing apparatus such as a computer, an apparatus with an onboard device that acquires speech, such as a microphone, or any of various other types of apparatus, and constitute part of the apparatus.

The speech recognition apparatus 100 includes a sound information acquisition unit 10, a sound source activity detection unit 11, a direction estimation unit 12, an adaptation processing unit 13, an adaptation process convergence monitoring unit 14, a buffer size decision unit 15, a buffer 16, a beamforming processing unit 17, and a speech recognition unit 18.

The respective structural elements of the sound information acquisition unit 10, the sound source activity detection unit 11, the direction estimation unit 12, the adaptation processing unit 13, the adaptation process convergence monitoring unit 14, the buffer size decision unit 15, the beamforming processing unit 17, and the speech recognition unit 18 are elements that execute respective processes. Each of the respective structural elements may constitute one element individually, or multiple structural elements may constitute a single element.

Each structural element may be configured by dedicated hardware, but may also be realized by executing a software program suited to each structural element. In this case, each structural element may include a computational processor (not illustrated) and storage (not illustrated) that stores a control program, for example. Examples of a computational processor include a micro-processing unit (MPU) and a central processing unit (CPU). An example of storage is memory. Note that each structural element may be configured as a single element that performs centralized control, or may be configured as multiple elements that cooperate with each other to perform decentralized control. The software program may be provided as an application by communication over a communication network such as the Internet, communication according to a mobile communication standard, or the like.

In addition, each structural element may also be a circuit such as a large-scale integration (LSI) or system LSI chip. Multiple structural elements may constitute a single circuit overall, or may constitute respectively separate circuits. Also, each circuit may be a general-purpose circuit or a special-purpose circuit.

A system LSI chip is a multi-function LSI chip fabricated by integrating multiple components onto a single chip, and specifically is a computer system including a microprocessor, read-only memory (ROM), random access memory (RAM), and the like. A computer program is stored in the RAM. As a result of the microprocessor operating by following the computer program, the system LSI chip achieves the functions thereof. A system LSI chip and an LSI chip may also be a field-programmable gate array (FPGA) capable of being programmed after LSI fabrication, or include a reconfigurable processor whose internal LSI circuit cell connections and settings may be reconfigured.

Also, some or all of the above structural elements may be configured as a removable IC card or a separate module. The IC card or the module is a computer system made up of components such as a microprocessor, ROM, and RAM. The IC card or the module may also include the LSI chip or system LSI chip discussed above. As a result of the microprocessor operating according to the computer program, the IC card or the module achieves the functions thereof. The IC card and the module may also be tamper-resistant.

The buffer 16 is an element that temporarily stores and accumulates information. For example, the buffer 16 made be made up of semiconductor memory or the like, and may be made up of volatile memory or non-volatile memory. As discussed later, the buffer 16 holds sound information acquired by the microphones 1, according to a buffer size decided by the buffer size decision unit 15. The buffer 16 holding sound information according to the buffer size may mean that the buffer 16 accumulates sound information equal to the buffer size, may mean that the buffer 16 secures sound information equal to the buffer size from among sound information accumulated in the buffer 16, or may mean that the buffer 16 accumulating sound information frees up memory corresponding to the buffer size.

The sound information acquisition unit 10 acquires an observed signal from the multiple microphones 1 as sound information. The sound information acquisition unit 10 sends the acquired observed signal to various structural elements of the speech recognition apparatus 100, such as the sound source activity detection unit 11 and the buffer 16. The sound information acquisition unit 10 may also be provided with a communication interface for communicating with the microphones 1 or the like.

Figure 3:
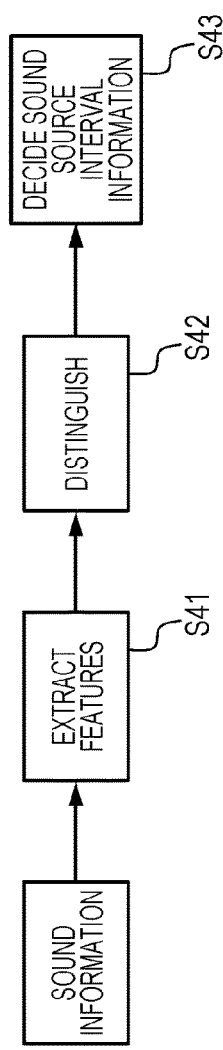
FIG. 3 is a diagram illustrating an example of the flow of a process of detecting a sound source interval.

The sound source activity detection unit 11 uses the observed signal acquired by the microphones 1 to detect a sound source interval. The sound source interval is an interval that includes sound from a sound source, from among the observed signal generated by the microphones 1. For example, the sound source interval may be made up of a time interval. The sound source activity detection unit 11 detects a sound source interval according to the method described below, for example. Referring to FIG. 3, an example of the flow of a process of detecting a sound source interval is illustrated. In the example illustrated in FIG. 3, the energy of the observed signal is treated as a feature of the observed signal, and the features of the observed signal are extracted (step S41). Furthermore, from the observed signal, it is distinguished whether or not the energy of the sound signal of noise is exceeded (step S42). Subsequently, an observed signal with energy greater than the energy of the sound signal of noise is detected, and the information in an interval formed by the detected observed signal is treated as sound source interval information (step S43). For example, for the observed signal from one microphone 1 among the multiple microphones 1, the short-time energy p of the observed signal is calculated according to Formula 1 below.

$$p = \frac{1}{T} \sum_{t}^{t+T-1} x(t)^2 \quad \text{(Formula 1)}$$

Herein, in Formula 1 above, t represents the discrete time of the observed signal, x(t) represents the sound information of the observed signal acquired by one microphone 1, and T represents the number of samples used to calculate the short-time energy. Note that x(t) is a discrete-time signal of the observed signal. Additionally, the interval formed by the observed signal constituting the short-time energy p is a sound source interval if p is larger than a threshold value, and a non-sound source interval if p is smaller than a threshold value. The non-sound source interval is an interval that does not include sound from a sound source. By setting separate threshold values, it is also possible to additionally detect a speech interval in which a speech signal is included from among the sound source interval. Consequently, from among the sound source interval, a speech interval and a non-speech interval may be distinguished. The non-speech interval is an interval that is included in the sound source interval and that is not the speech interval. The method of detecting a sound source interval performed by the sound source activity detection unit 11 may also be a method other than the above method. Also, although the above describes a method of detecting a sound source interval using just the sound information from one microphone 1, all sound information acquired by multiple microphones 1 may also be utilized to detect a sound source interval.

Figure 4:
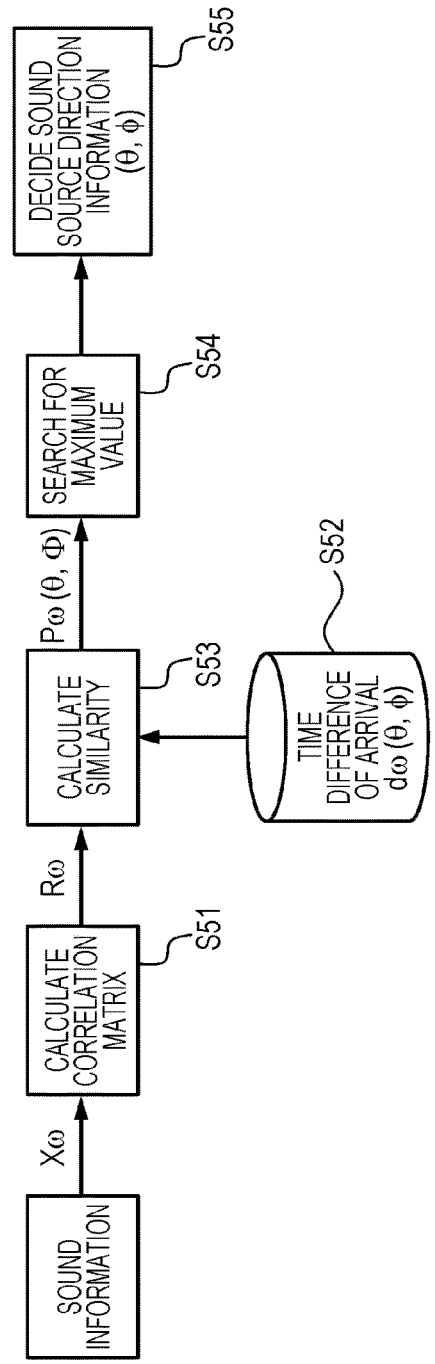
FIG. 4 is a diagram illustrating an example of the flow of a process of estimating the direction of sound.

The direction estimation unit 12 conducts direction estimation on the signal of a speech interval from among the sound source interval detected by the sound source activity detection unit 11, and acquires an estimated direction of speech. The direction estimation unit 12 acquires an estimated direction regarding the observed signal of a speech interval according to the method described below, for example. Referring to FIG. 4, an example of the flow of a process of estimating the direction of sound is illustrated. In the example illustrated in FIG. 4, a correlation matrix expressing the signal arrival time differences between the microphones 1 is calculated from the observed signal acquired by the multiple microphones 1 (step S51). In the case of using M microphones 1, the sound information $X_\omega$ of the observed signal acquired by the M microphones 1 is expressed by Formula 2 below.

$$X_\omega = [X_{\omega,1}, \ldots, X_{\omega,M}] \quad \text{(Formula 2)}$$

Herein, in Formula 2, ω represents the discrete frequency of the observed signal, and $X_{\omega,m}$ (where m=1 to M) represents the sound information acquired by the mth microphone 1. Additionally, the correlation matrix $R_\omega$ is calculated according to Formula 3 below. Note that $X_\omega^H$ is the adjoint matrix of $X_\omega$.

$$R_\omega = X_\omega X_\omega^H \quad \text{(Formula 3)}$$

Also, in the case of expressing the sound source direction by using the two variables of the azimuth θ in the horizontal direction and the elevation φ in the vertical direction, the vector $d_\omega(\theta, \varphi)$ expressing the observed signal arrival time differences between the microphones 1 at the discrete frequency ω is calculated by Formula 4 below (step S52).

$$d_\omega(\theta,\varphi) = [1 \ldots \exp(-j\omega\tau_M(\theta,\varphi))]^T \quad \text{(Formula 4)}$$

Herein, in Formula 4, j represents the complex sign, and $\tau_m(\theta, \varphi)$ (where m=1 to M) expresses the relative delay time when a sound wave arriving from the sound source direction (θ, φ) is picked up by the mth microphone 1, using the 1st microphone 1 as a reference. Note that in the present embodiment, the 1st microphone 1 is the microphone that initially picks up the sound wave arriving from the sound source direction (θ, φ), but may also be chosen arbitrarily from among the M microphones 1.

Next, the similarity $P_\omega(\theta, \varphi)$ between the correlation matrix $R_\omega$ expressing the observed signal arrival time differences between the microphones 1 and the vector $d_\omega(\theta, \varphi)$ is calculated according to Formula 5 below (step S53).

$$P_\omega(\theta,\varphi) = d_\omega(\theta,\varphi)^H R_\omega d_\omega(\theta,\varphi) \quad \text{(Formula 5)}$$

Subsequently, a search is conducted for the sound source direction (θ, φ) at which the similarity $P_\omega(\theta, \varphi)$ is maximized (step S54), and this sound source direction (θ, φ) is treated as the estimated result of the sound source direction, or in other words, sound source direction information (step S55). The method of estimating the direction of sound used by the direction estimation unit 12 may also be a method other than the above-described.

Figure 5:
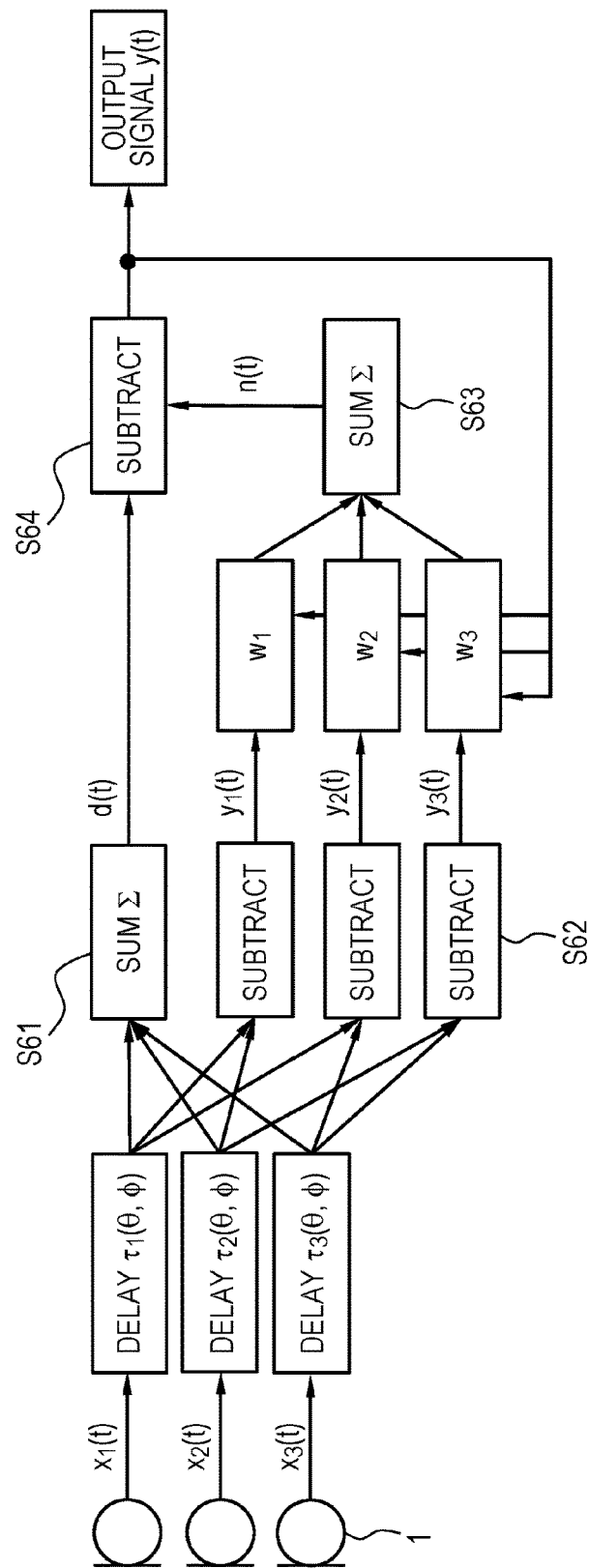
FIG. 5 is a diagram illustrating an example of the flow of a process of estimating filter coefficients in an adaptation process.

The adaptation processing unit 13 uses the observed signal acquired by the microphones 1 to estimate filter coefficients for extracting speech in the speaker direction acquired by the direction estimation unit 12. The adaptation processing unit 13 estimates filter coefficients according to the method described below, for example. Referring to FIG. 5, an example of the flow of a process of estimating filter coefficients in an adaptation process is illustrated. In the example illustrated in FIG. 5, first, a signal d(t) obtained by enhancing the signal of the sound source in the estimated direction (θ, φ) acquired by the direction estimation unit 12 is calculated according to Formula 6 below (step S61).

$$d(t) = \sum_{m=0}^{M-1} x_m(t - \tau_m(\theta, \varnothing))$$ (Formula 6)

Herein, in Formula 6, M represents the quantity of microphones 1, t represents the discrete time of the observed signal, $x_m(t)$ (where m=0, 1, . . . , M-1) represents the input signal from a microphone 1, or in other words the observed signal, and $\tau_m(\theta, \varphi)$ (where m=0, 1, . . . , M-1) represents the delay time in the case of the sound source existing in the direction (θ, φ). As discussed earlier, the delay time $\tau_m(\theta, \varphi)$ expresses the relative delay time when a sound wave arriving from the sound source direction (θ, φ) is picked up by the mth microphone 1, using the 1st microphone 1 as a reference. For example, $x_m(t)$ may be the signal of a speech interval detected by the sound source activity detection unit 11.

In addition, a signal $y_m(t)$ (where m=0, 1, . . . , M-2) isolating a signal in a desired direction is calculated according to Formula 7 below (step S62). Note that the desired direction is the estimated direction of speech.

$$y_m(t) = x_m(t - \tau_m(\theta, \varphi)) - x_{m+1}(t - \tau_{m+1}(\theta, \varphi))$$ (Formula 7)

Next, an estimated noise signal n(t) is calculated by conducting a filter process on $y_m(t)$ and summing the results, as expressed in Formula 8 below (step S63).

$$n(t) = \sum_{m=1}^{M-2} \sum_{k=0}^{L-1} w_m(k) y_m(t - k)$$ (Formula 8)

Herein, in Formula 8, L represents the number of taps in the adaptive filter, and $w_m(k)$ represents the coefficients of the adaptive filter.

Next, an output signal y(t) is calculated by Formula 9 below (step S64).

$$y(t) = d(t-\tau) - n(t)$$ (Formula 9)

Herein, in Formula 9, τ represents the delay for aligning the phase between d(t) and n(t).

The coefficients $w_m(k)$ of the adaptive filter are updated successively so that an expected value J of the error e(t) expressed by Formulas 10 and 11 below becomes smaller.

$$J = E[e(t)^2]$$ (Formula 10)

$$e(t) = d(t) - y(t)$$ (Formula 11)

Herein, in Formula 10, E[.] represents the expected value operation. Note that the adaptation processing method used by the adaptation processing unit 13 may also be a method other than the above.

Figure 6:
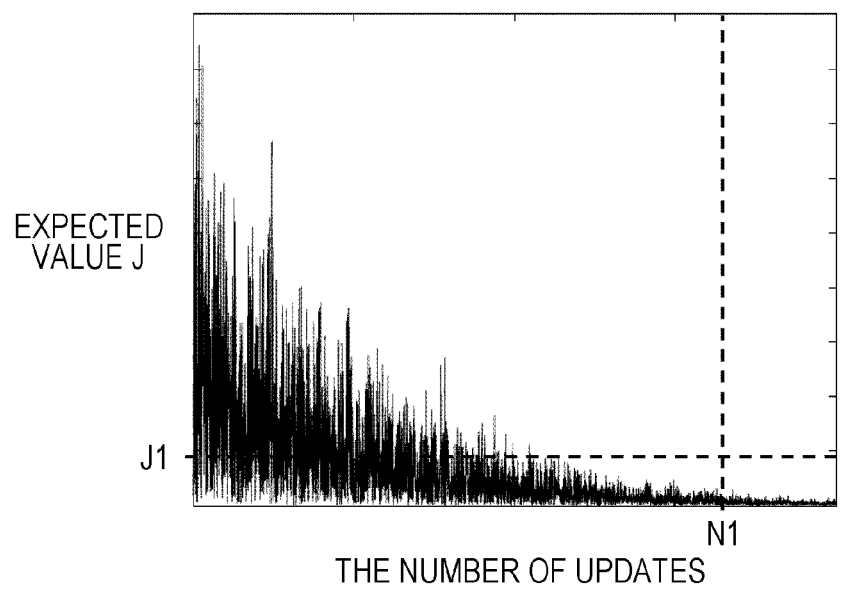
FIG. 6 is a diagram illustrating an example of an expected value of the error of each update of filter coefficients when estimating filter coefficients.

The adaptation process convergence monitoring unit 14 judges the convergence/non-convergence of the adaptation process from the update state of the filter coefficients in the adaptation processing unit 13. Specifically, the adaptation process convergence monitoring unit 14 judges that the adaptation process has converged if the expected value J of the error e(t) calculated by the adaptation processing unit 13 is less than a predetermined threshold value, and judges that the adaptation process has not converged if the expected value J is equal to or greater than the threshold value. Referring to FIG. 6, an example of the expected value J of the error of each update of the filter coefficients when estimating filter coefficients is illustrated. In FIG. 6, the vertical axis represents the magnitude of the expected value J, while the horizontal axis represents the number of times that the filter coefficients $w_m(k)$ have been updated. As illustrated in FIG. 6, as the number of updates to the filter coefficients $w_m(k)$ increases, the expected value J gradually becomes smaller. Subsequently, the adaptation process convergence monitoring unit 14 judges that the adaptation process has not converged if the expected value J is equal to or greater than a threshold value J1, and judges that the adaptation process has converged if the expected value J falls below the threshold value J1. Note that the adaptation process convergence monitoring unit 14 may also judge that the adaptation process has converged if the number of updates to the filter coefficient reaches a certain count N1, and judge that the adaptation process has not converged if the number of updates to the filter coefficient is less than the certain count N1. Furthermore, the adaptation process convergence monitoring unit 14 may also judge the convergence of the adaptation process by using both the expected value J and the number of updates.

The buffer size decision unit 15 decides the buffer size for sound information to use in the process by the beamforming processing unit 17, based on information about the sound source interval acquired by the sound source activity detection unit 11, information about the estimated direction estimated by the direction estimation unit 12, and information about the convergence state of the adaptation process acquired by the adaptation process convergence monitoring unit 14. Specifically, the buffer size for sound information held in the buffer 16 is decided. Note that the buffer size is an amount of sound information arranged in a time series, and thus may also be expressed using length. For example, a long buffer indicates that the buffer size is large, whereas a short buffer indicates that the buffer size is small.

Figure 7:
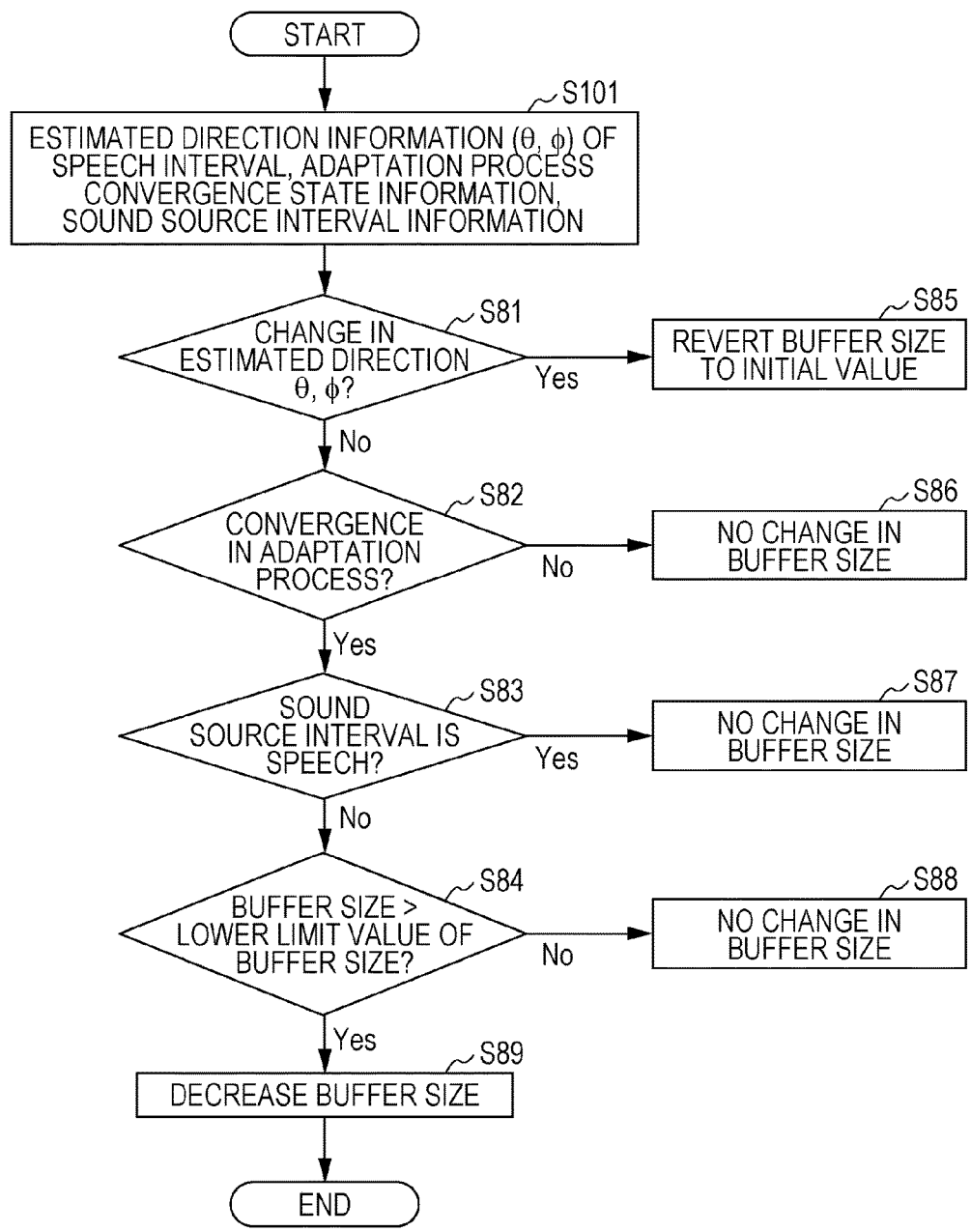
FIG. 7 is a diagram illustrating an example of the flow of a process of deciding a buffer size.

The buffer size decision unit 15 decides the buffer size according to the method described below, for example. Referring to FIG. 7, an example of the flow of a process of deciding the buffer size is illustrated. Also, in FIG. 8, an example of a list of each case for the buffer size decided by the process in FIG. 7 is illustrated. In the examples illustrated in FIGS. 7 and 8, first, if the estimated direction information (θ, φ) acquired by the direction estimation unit 12 has changed from the previously acquired estimated direction information ($\theta_{t-1}$, $\varphi_{t-1}$) (step S81, Yes), the buffer size decision unit 15 increases the buffer size for sound information held in the buffer 16 (step S85). The determination of whether or not the estimated direction of speech, such as the speaker direction, has changed may be performed by using the following Formula 12, for example. The buffer size decision unit 15 determines that there is a change if the variation Δ in the estimated direction computed according to Formula 12 is greater than a threshold value, and determines that there is no change if the variation Δ is less than or equal to a threshold value.

$$\Delta = |\theta - \theta_{t-1}| + |\varphi - \varphi_{t-1}|$$ (Formula 12)

Immediately after the estimated direction information changes, the buffer size decision unit 15 reverts the buffer size to an initial value Q, regardless of the convergence state of the adaptation process and the sound source interval information. Note that the initial value Q is a buffer size having the maximum size required by the process by the beamforming processing unit 17 from the start of the adaptation process until convergence is reached in the adaptation processing unit 13. Thus, at this point, the buffer size is at a maximum. Consequently, a buffer of sufficient size to handle from the start of the adaptation process until convergence is used to compute the filter coefficients to use in the process by the beamformer, and thus high-quality speech with no loss of the start of speech is obtained.

Next, if the estimated direction information has not changed from the previously acquired estimated direction information (step S81, No), and the adaptation process convergence monitoring unit 14 judges that the adaptation process has not converged (step S82, No), the buffer size decision unit 15 does not change the buffer size (step S86). Note that even if the speech interval changes to a non-speech interval, the estimated direction information is treated as not changing from the previously acquired estimated direction information.

Also, even if the estimated direction information has not changed from the previous estimated direction information (step S81, No), and the adaptation process convergence monitoring unit 14 judges that the adaptation process has converged (step S82, Yes), when sound source interval information newly acquired by the sound source activity detection unit 11 is a speech interval (step S83, Yes), the buffer size decision unit 15 does not change the buffer size (step S87).

Next, if the estimated direction information has not changed from the previous estimated direction information (step S81, No), the adaptation process is in a converged state (step S82, Yes), the newly detected sound source interval information is a non-speech interval (step S83, No), and the current buffer size is less than a preset lower limit value (step S84, No), the buffer size decision unit 15 does not change the buffer size (step S88).

Finally, if the estimated direction information has not changed from the previous estimated direction information (step S81, No), the adaptation process is in a converged state (step S82, Yes), the newly detected sound source interval information is a non-speech interval (step S83, No), and the current buffer size is greater than a preset lower limit value (step S84, Yes), the buffer size decision unit 15 decreases the buffer size (step S89). When the estimated direction information is constant and the adaptation process is converged, decreasing the buffer size when a non-speech interval is detected as the sound source interval information speeds up the speech recognition response.

At this point, in a case in which a lower limit value on the buffer size is not set, a configuration is possible in which if the estimated direction information has not changed from the previously acquired estimated direction information (step S81, No), the adaptation process is in a converged state (step S82, Yes), and the newly detected sound source interval information is a non-speech interval (step S83, No), the buffer is decreased, as illustrated in FIG. 8.

The beamforming processing unit 17 uses sound information such as the observed signal acquired by the microphone 1 and the filter coefficients estimated by the adaptation processing unit 13 to conduct a beamforming process on the input signal held in the buffer 16, or in other words, the sound information. The beamforming processing unit 17, by conducting the beamforming process, outputs speech information from the sound information acquired by the microphone 1 as an output signal. Herein, the flow of the process for obtaining an output signal with the beamforming process is similar to the procedure of the adaptation processing unit 13 performing the processes from steps S61 to S64 illustrated in FIG. 5, and calculating the output signal y(t). In other words, the beamforming processing unit 17 computes the output signal y(t).

The speech recognition unit 18 conducts speech recognition on the speech information processed by the beamforming processing unit 17. For example, the speech recognition unit 18 converts the speech information into a speech signal.

[Operations of Speech Recognition Apparatus]

Figure 9:
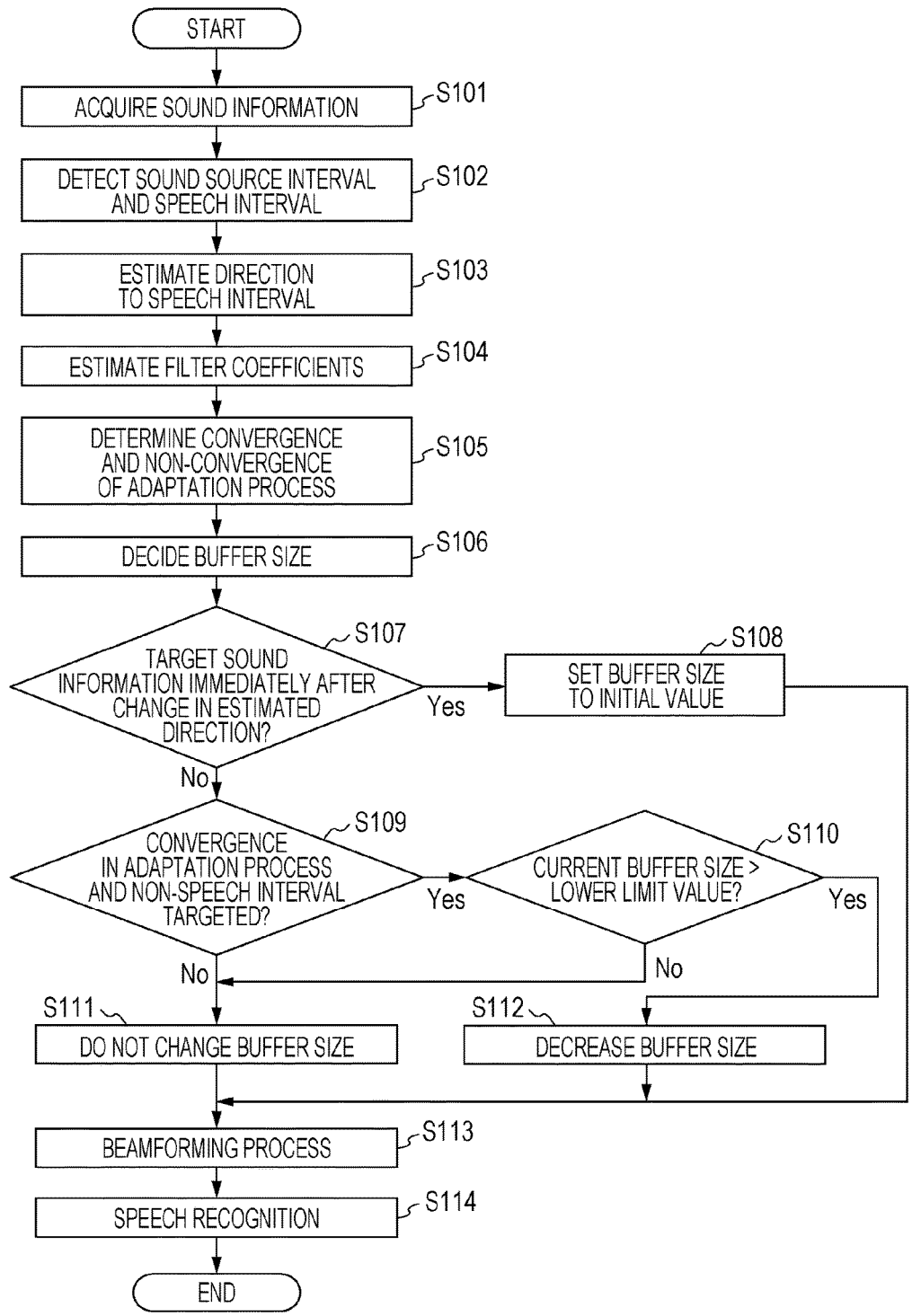
FIG. 9 is a flowchart illustrating an example of the flow of operations of a speech recognition apparatus according to Embodiment 1.

An example of the operations of the speech recognition apparatus 100 according to Embodiment 1 will be described with reference to FIGS. 2 and 9. FIG. 9 is a flowchart illustrating an example of the flow of operations of the speech recognition apparatus 100 according to Embodiment 1. The sound information acquisition unit 10 of the speech recognition apparatus 100 acquires an observed signal of sound, or in other words sound information, via the multiple microphones 1 (step S101). As discussed later, the observed signal acquired by the sound information acquisition unit 10 is used in the sound source activity detection unit 11, the direction estimation unit 12, and the adaptation processing unit 13 of the speech recognition apparatus 100, and also is stored temporarily in the buffer 16.

The sound source activity detection unit 11 detects a sound source interval from the observed signal of the multiple microphones 1, and also a speech interval inside the sound source interval (step S102). In other words, a speech interval and a non-speech interval in the sound source interval are specified. The sound source activity detection unit 11 sends information about the sound source interval, the speech interval, and the like to the direction estimation unit 12 as sound information. As discussed later, the information about the sound source interval, the speech interval, and the like is also used by the adaptation processing unit 13, the buffer size decision unit 15, and the beamforming processing unit 17.

The direction estimation unit 12 conducts direction estimation on the speech interval from among the information received from the sound source activity detection unit 11, and computes the estimated direction of speech (step S103). The direction estimation unit 12 sends information associating the computed estimated direction and the speech interval to the adaptation processing unit 13 as sound information. Such information about the estimated direction and the speech interval is also used by the buffer size decision unit 15.

The adaptation processing unit 13 uses the observed signal acquired by the microphones 1 and the speech interval information detected by the sound source activity detection unit 11 to estimate filter coefficients for extracting speech in the estimated direction received from the direction estimation unit 12 (step S104). The adaptation processing unit 13 estimates the filter coefficients while successively updating the filter coefficients, and for every update, sends the filter coefficients to the adaptation process convergence monitoring unit 14 of the speech recognition apparatus 100.

The adaptation process convergence monitoring unit 14 judges, from the state of the filter coefficients successively received from the adaptation processing unit 13, whether the adaptation process is converged or non-converged (step S105). In other words, it is judged whether the filter coefficients are converged or non-converged. The adaptation process convergence monitoring unit 14 may perform the above judgment based on the expected value J of the error e(t) between the signal d(t) obtained by enhancing the observed signal in the estimated direction and the output signal y(t) obtained by subtracting the noise signal n(t) from the signal d(t), may perform the above judgment based on the number of updates to the filter coefficients, or may perform the above judgment based on both the expected value J and the number of updates to the filter coefficients. The adaptation process convergence monitoring unit 14 sends the judgment result about the convergence or non-convergence of the adaptation process to the buffer size decision unit 15.

The buffer size decision unit 15 decides the buffer size for the sound information such as the observed signal held in the buffer 16, based on the adaptation process convergence state received from the adaptation process convergence monitoring unit 14 (step S106). Specifically, the buffer size decision unit 15 decides the buffer size based on the information about the sound source interval, the speech interval, and the like detected by the sound source activity detection unit 11, the estimated direction estimated by the direction estimation unit 12, and the adaptation process convergence state received from the adaptation process convergence monitoring unit 14.

Subsequently, the buffer size decision unit 15 determines whether or not the sound information which is the target of the speech recognition process in the speech recognition apparatus 100, or in other words the observed signal, is a signal immediately after a change in the estimated direction (step S107). In other words, it is determined whether or not the estimated direction of the target observed signal has changed from the last observed signal that was observed. Note that the estimated direction also changes in a case of going from a silent state to a state in which speech is emitted from a sound source. For this reason, an observed signal immediately after the speech recognition process is first started is also considered to be a signal immediately after a change in the estimated direction.

Figure 10:
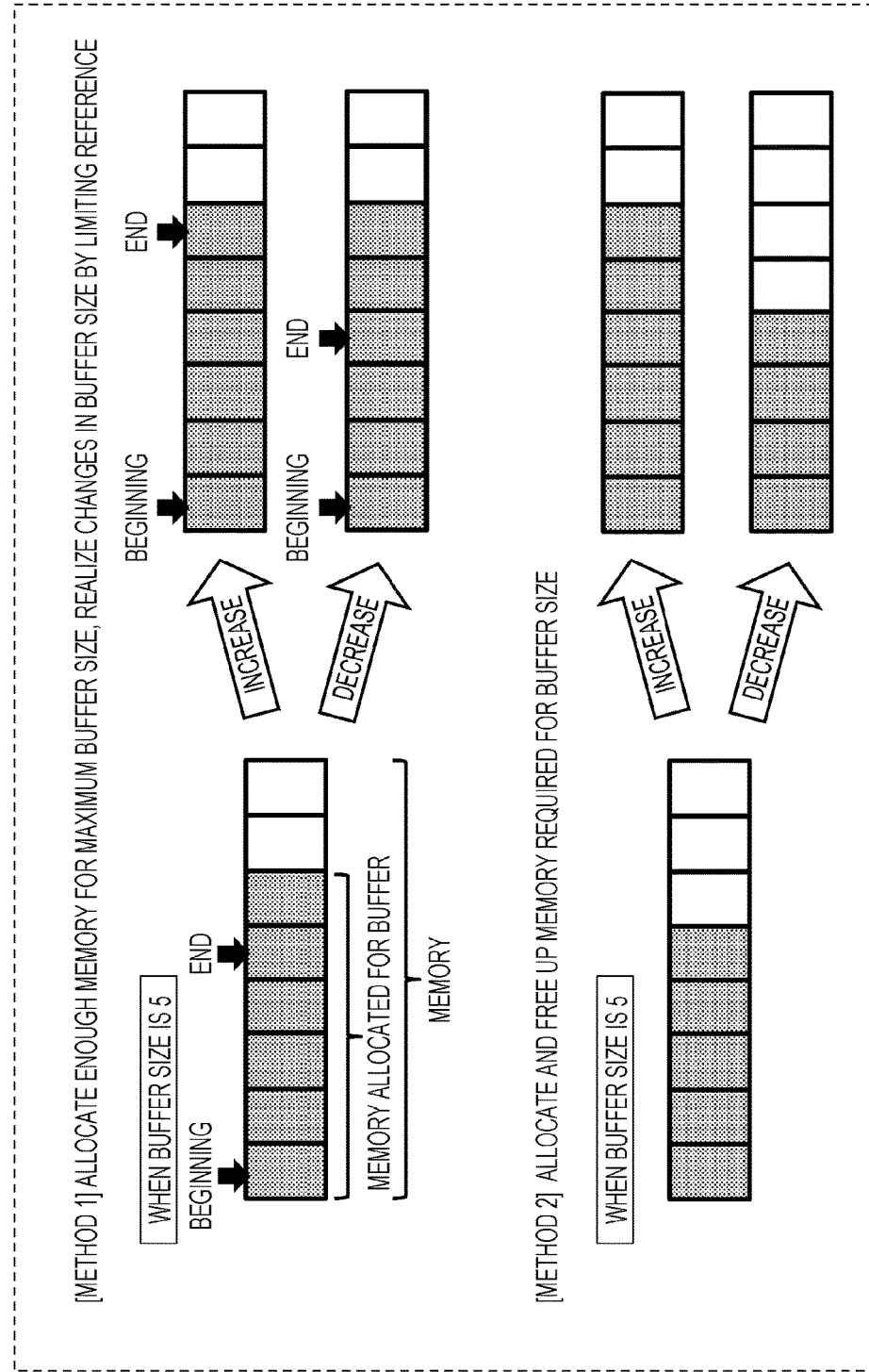
FIG. 10 is a diagram explaining an example of holding sound information in a buffer.

If the observed signal is a signal immediately after a change in the estimated direction (step S107, Yes), the buffer size decision unit 15 sets the buffer size to the initial value (step S108). Specifically, the buffer size decision unit 15 decides the buffer size to be an initial value which is a size sufficient for the convergence of the adaptation process. For example, the buffer size of a size sufficient for the convergence of the adaptation process may be treated as the buffer size of the maximum size required from the start of the adaptation process until convergence in the beamforming process performed on the observed signal prior to the current process. Alternatively, the buffer size of a size sufficient for the convergence of the adaptation process may be a preset size. The buffer size decision unit 15 changes the buffer size to be held by the buffer 16, based on the decided buffer size. For example, in FIG. 10, a diagram explaining an example of holding in the buffer 16 is illustrated. Method 1 illustrates an example in which sound information is held by having the buffer 16 secure sound information of a certain buffer size from among the sound information accumulated in the buffer 16. Specifically, in the buffer 16, memory equal to the maximum buffer size is allocated, and by limiting the range of reference to the allocated memory, the holding of sound information in a certain buffer size and the modification of the buffer size are realized. Method 2 illustrates an example in which sound information is held by having the buffer 16 accumulating sound information free up memory corresponding to a certain buffer size. Specifically, in the buffer 16, by allocating and freeing up memory equal to the required buffer size, the holding of sound information in a certain buffer size and the modification of the buffer size are realized.

If the observed signal is not a signal immediately after a change in the estimated direction (step S107, No), the buffer size decision unit 15 decides the buffer size so as not to change the buffer size or to decrease the buffer size from the buffer size implemented in the processing of the observed signal prior to the targeted observed signal. The buffer size decision unit 15 adjusts the buffer size to be held by the buffer 16, based on the decided buffer size.

Specifically, the buffer size decision unit 15 determines whether or not the adaptation process has converged, and whether or not the sound source interval detected from the targeted observed signal is a non-speech interval (step S109). If the adaptation process has not converged or if the detected sound source interval is a speech interval (step S109, No), the buffer size decision unit 15 decides the buffer size so as not to change the buffer size (step S111). The buffer size decision unit 15 maintains the buffer size to be held by the buffer 16, based on the decided buffer size.

If the adaptation process has converged and the detected sound source interval is a non-speech interval (step S109, Yes), the buffer size decision unit 15 judges whether or not the current buffer size is greater than a preset lower limit value (step S110). For example, cases in which the estimated direction of speech has not changed and the detected sound source interval is a non-speech interval may include cases in which the speaker who had been producing speech does not produce speech due to an intake of breath, hesitation, or the like.

The lower limit value of the buffer size will now be described. For example, even if the filter coefficients have converged on an optimal value by the adaptation process, the optimal value of the filter coefficients may change due to the influence of a change in the sound environment around the microphones 1, such as a change in noise or the like. For this reason, it is necessary to conduct the adaptation process again. In a sound environment in which the change is small, the change in the optimal value of the filter coefficients is also small, whereas in a sound environment in which the change is large, the change in the optimal value of the filter coefficients is also large. For example, in a state in which a small buffer is set, if the optimal value of the filter coefficients changes greatly, there is a possibility that the noise suppression performance in the beamforming process may be lowered. The lower limit value of the buffer size is taken to be a buffer size at which a reduction in the performance of the beamforming process is minimized, even if the optimal value of the filter coefficients varies. For example, the lower limit value of the buffer size is set to a large value in a sound environment with large changes, whereas the lower limit value of the buffer size is set to a small value or zero in a sound environment with small changes. In other words, the lower limit value of the buffer size is set according to the sound environment around the microphones 1.

If the current buffer size is greater than the lower limit value (step S110, Yes), the buffer size decision unit 15 decides the buffer size so as to decrease the buffer size (step S112). If the current buffer size is less than or equal to the lower limit value (step S110, No), the buffer size decision unit 15 decides the buffer size so as not to change the buffer size (step S111).

The beamforming processing unit 17 uses the observed signal acquired by the microphone 1 and the filter coefficients estimated by the adaptation processing unit 13 to conduct a beamforming process on sound information such as the observed signal held in the buffer 16 as discussed above (step S113). As a result, the beamforming processing unit 17 outputs speech information of the observed signal acquired by the microphone 1.

The speech recognition unit 18 conducts speech recognition on the speech information processed by the beamforming processing unit 17 (step S114). Consequently, the speech recognition apparatus 100 recognizes speech from the observed signal acquired by the microphone 1.

According to the processes in steps S107 and S108, immediately after a point in time at which the direction of speech changes, such as when a speaker starts speaking, the position of the speaker changes, or the speech changes to a different speaker, the speech recognition apparatus 100 uses the sound information with a sufficient buffer size to perform speech recognition with the beamforming process and the like. Thus, high-quality speech recognition with no loss of the start of speech becomes possible.

According to the processes in steps S107, S109, S110, and S112, when a silence interval occurs, such as an intake of breath or hesitation by the speaker, the speech recognition apparatus 100 uses sound information with a decreased buffer size to perform speech recognition with the beamforming process and the like. Thus, the processes related to speech recognition in the silence interval are sped up.

According to the processes in steps S107, S109, S110, and S111, the speech recognition apparatus 100 moderates excessive decreases in the buffer size, and as a result, minimizes lowering of the speech recognition accuracy and speed by the beamforming process and the like.

According to the processes in steps S107, S109, and S111, the speech recognition apparatus 100 maintains the buffer size when processing a speech interval, and as a result, minimizes lowering of the speech recognition accuracy and speed by the beamforming process and the like. Furthermore, the speech recognition apparatus 100 maintains the buffer size if the adaptation process has not converged, and as a result, moderates slowdowns in the convergence of the adaptation process.

Note that in the process of step S110, the current buffer size is compared to a preset lower limit value, but this process may also be skipped. In this case, in the case of Yes in step S109, the buffer size decision unit 15 decides the buffer size so as to decrease the buffer size.

Figure 11:
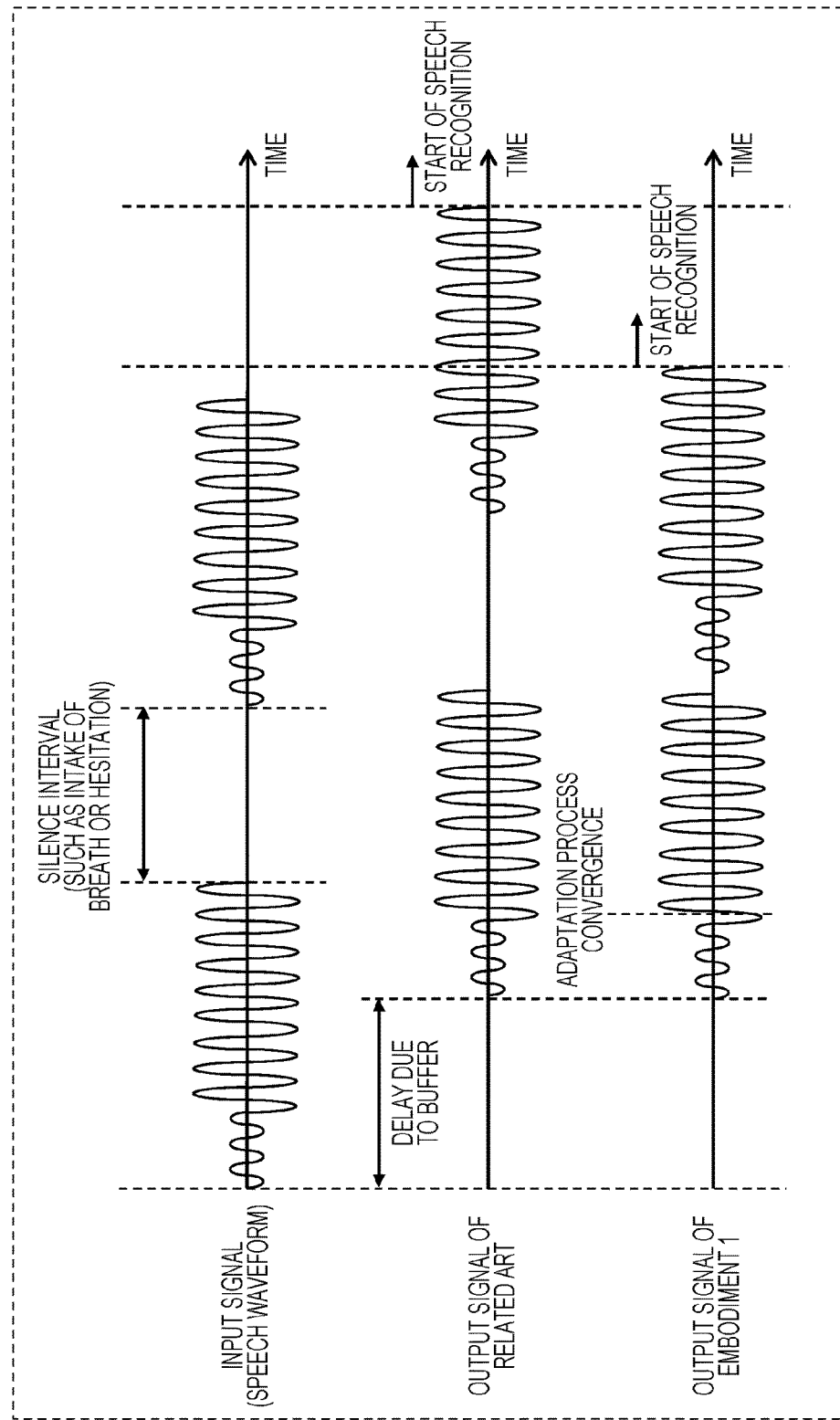
FIG. 11 is a diagram comparing a speech waveform input into a microphone, a waveform of a signal output by a speech recognition method of the related art, and a waveform of a signal output by a speech recognition apparatus according to Embodiment 1.

An example of a signal output by the speech recognition apparatus 100 as discussed above is illustrated in FIG. 11. FIG. 11 is a diagram comparing a speech waveform input into a microphone 1, a waveform of a signal output by a speech recognition method of the related art, and a waveform of a signal output by the speech recognition apparatus 100 according to Embodiment 1. In FIG. 11, the horizontal axis is the time axis. In the output signal of the speech recognition apparatus 100, the processing speed for the silence interval of the input signal is greatly improved over the speech recognition method of the related art. Consequently, the delay in the output of the second input signal with respect to the output of the first input signal in the speech recognition apparatus 100 is much shorter than the speech recognition method of the related art, and the start times of speech recognition on the two input signals in the speech recognition apparatus 100 come earlier than the speech recognition method of the related art. Thus, according to the speech recognition apparatus 100, real-time speech recognition of a speaker's sound production becomes possible.

Embodiment 2

[Configuration of Speech Recognition Apparatus]

A configuration of a speech recognition apparatus 200 according to Embodiment 2 will be described with reference to FIG. 12. The speech recognition apparatus 200 according to Embodiment 2 is configured so that when the direction of speech changes, the speech recognition apparatus 200 compares and selects between a process using existing, already-computed filter coefficients and a process using newly-computed filter coefficients, and uses the process with the selected filter coefficients to perform a speech recognition process after the change in the direction of speech. Hereinafter, the points by which the speech recognition apparatus 200 according to Embodiment 2 differs from the speech recognition apparatus 100 according to Embodiment 1 will be described mainly, while description will be reduced or omitted for points that are similar.

Figure 12:
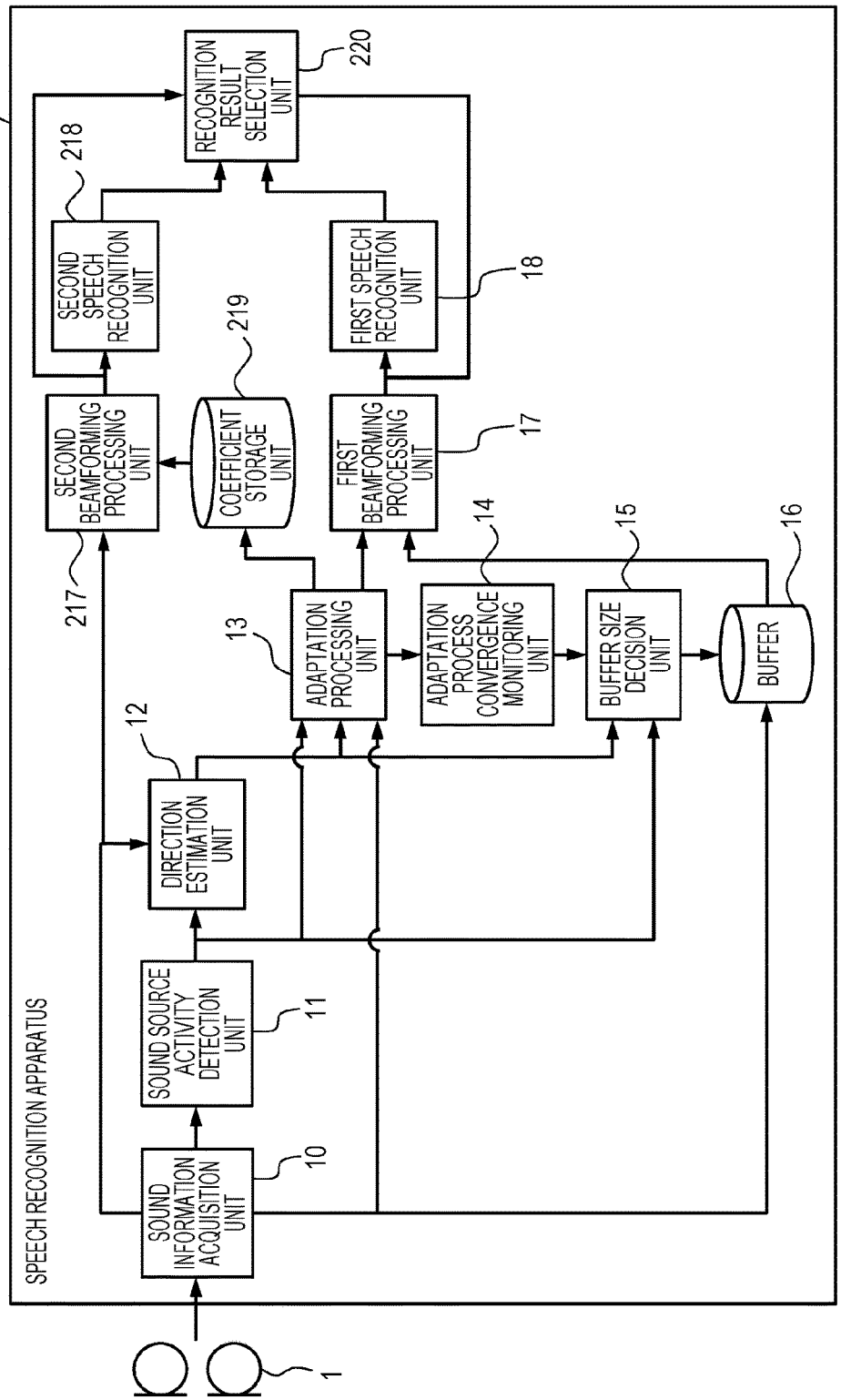
FIG. 12 is a block diagram illustrating a schematic configuration of a speech recognition apparatus according to Embodiment 2.

As illustrated in FIG. 12, the speech recognition apparatus 200 according to Embodiment 2 includes the sound information acquisition unit 10, the sound source activity detection unit 11, the direction estimation unit 12, the adaptation processing unit 13, the adaptation process convergence monitoring unit 14, the buffer size decision unit 15, and the buffer 16, similarly to the speech recognition apparatus 100 according to Embodiment 1. Additionally, the speech recognition apparatus 200 includes a beamforming processing unit and a speech recognition unit of similar configuration to the speech recognition apparatus 100 according to Embodiment 1 as a first beamforming processing unit 17 and a first speech recognition unit 18. Furthermore, the speech recognition apparatus 200 includes a second beamforming processing unit 217, a second speech recognition unit 218, a coefficient storage unit 219, and a recognition result selection unit 220. The second beamforming processing unit 217 and the second speech recognition unit 218 include functions similar to the first beamforming processing unit 17 and the first speech recognition unit 18, respectively.

The coefficient storage unit 219 holds the existing filter coefficients of the adaptive filter, or in other words, the filter coefficients currently being used in the speech recognition process. For example, the coefficient storage unit 219 holds filter coefficients by temporarily storing filter coefficients, similarly to the buffer 16. When the estimated direction of speech changes due to a change in the speaker direction or the like, the coefficient storage unit 219 holds the filter coefficients from before the change. Note that the filter coefficients held by the coefficient storage unit 219 may also not be the filter coefficients currently being used, and may instead be filter coefficients that were used in the past. The coefficient storage unit 219 may also hold multiple sets of filter coefficients. The filter coefficients held by the coefficient storage unit 219 may also be filter coefficients from after adaptation process convergence.

The second beamforming processing unit 217 uses the filter coefficients held in the coefficient storage unit 219 and the observed signal acquired by the microphone 1 to output a second output signal, which is speech information. In other words, the second beamforming processing unit 217 executes the beamforming process without using the sound information in the buffer 16. Note that the speech information output by the first beamforming processing unit 17 is designated the first output signal. The second speech recognition unit 218 conducts speech recognition on the second output signal processed by the second beamforming processing unit 217.

The recognition result selection unit 220 compares the first output signal from the first beamforming processing unit 17 to the second output signal from the second beamforming processing unit 217. Specifically, the recognition result selection unit 220 determines whether or not the speech recognition result of either of the first output signal and the second output signal is trustworthy. Subsequently, the recognition result selection unit 220 outputs the more trustworthy speech recognition result from between the speech recognition results of the first output signal and the second output signal.

[Operations of Speech Recognition Apparatus]

Figure 13:
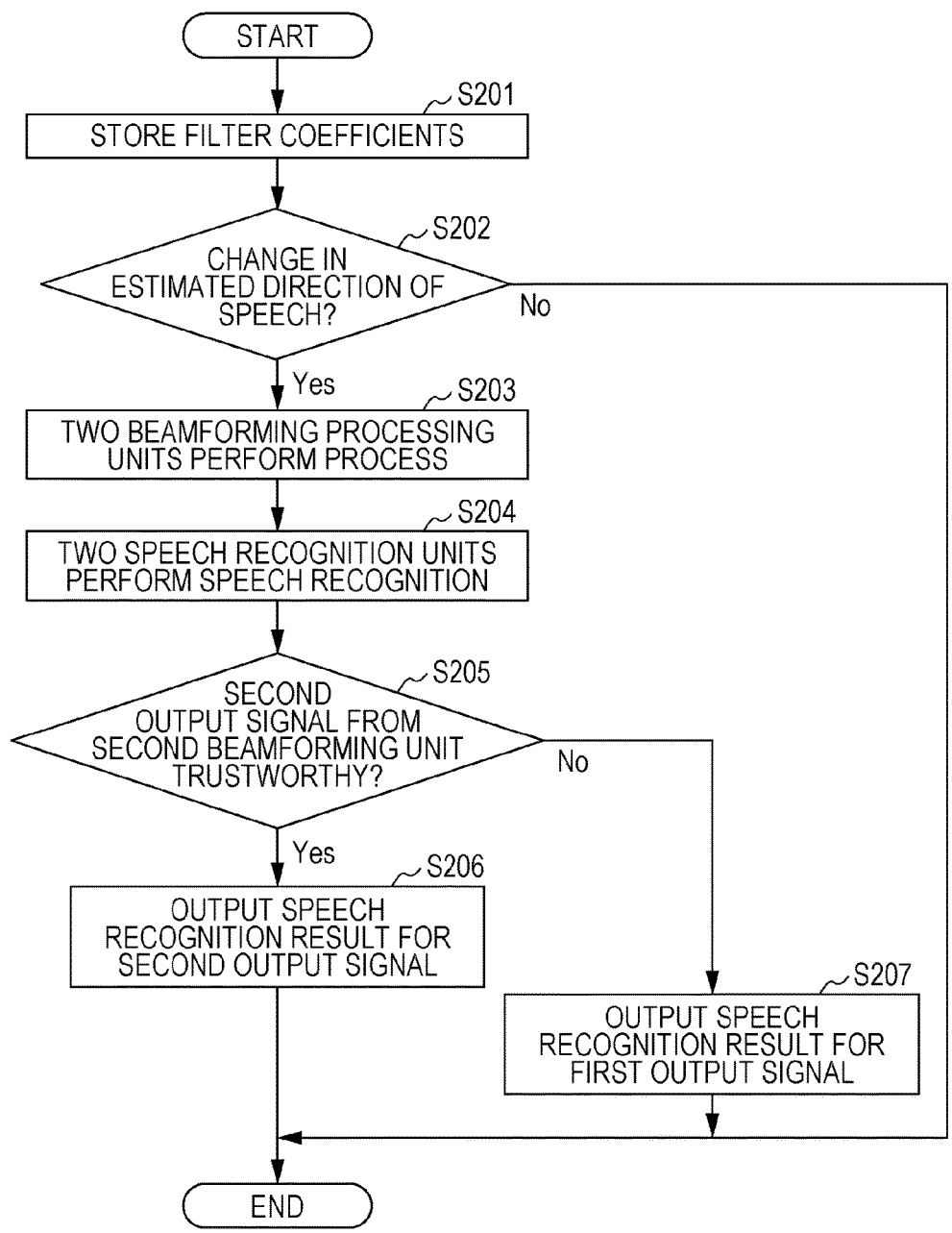
FIG. 13 is a flowchart illustrating an example of the flow of operations of a speech recognition apparatus according to Embodiment 2.

An example of the operations of the speech recognition apparatus 200 according to Embodiment 2 will be described with reference to FIGS. 12 and 13. FIG. 13 is a flowchart illustrating an example of the flow of operations of the speech recognition apparatus 200 according to Embodiment 2. The following describes an example of a case in which the direction of speech changes while the speech recognition apparatus 200 is operating in a similar state as the speech recognition apparatus 100 according to Embodiment 1. Before the direction of speech changes, the speech recognition apparatus 200 performs the speech recognition process using the first beamforming processing unit 17 and the first speech recognition unit 18, without using the second beamforming processing unit 217 and the second speech recognition unit 218.

During the speech recognition process by the speech recognition apparatus 200, the coefficient storage unit 219 stores the filter coefficients being used in the process (step S201). Also, the coefficient storage unit 219 acquires via the adaptation processing unit 13 the estimated direction of the speech detected by the direction estimation unit 12.

If the estimated direction of speech estimated by the direction estimation unit 12 changes (step S202, Yes), the coefficient storage unit 219 outputs the stored filter coefficients to the second beamforming processing unit 217. If the estimated direction of speech does not change (step S202, No), the speech recognition process is continued according to the processing method currently being performed.

As a result of a change in the estimated direction of speech estimated by the direction estimation unit 12, the second beamforming processing unit 217 starts a beamforming process using the stored filter coefficients, while the first beamforming processing unit 17 continues the beamforming process. In other words, the first beamforming processing unit 17 and the second beamforming processing unit 217 perform beamforming processes in parallel at the same time (step S203). Subsequently, the first beamforming processing unit 17 and the second beamforming processing unit 217 output their respective output signals to the first speech recognition unit 18, the second speech recognition unit 218, and the recognition result selection unit 220.

The first beamforming processing unit 17 performs a beamforming process using newly computed filter coefficients and sound information with a buffer size reverted to the initial value. For this reason, the first output signal from the first beamforming processing unit 17 is output after a delay due to the buffer size since the change in the estimated direction of speech.

The second beamforming processing unit 217 performs a beamforming process using the stored filter coefficients and the observed signal acquired from the microphone 1. For this reason, the amount of processing by the second beamforming processing unit 217 becomes much less than the amount of processing by the first beamforming processing unit 17. Furthermore, it is not necessary to compute filter coefficients. Thus, the second output signal from the second beamforming processing unit 217 is output after a greatly reduced delay compared to the first beamforming processing unit 17 since the change in the estimated direction of speech.

Figure 14:
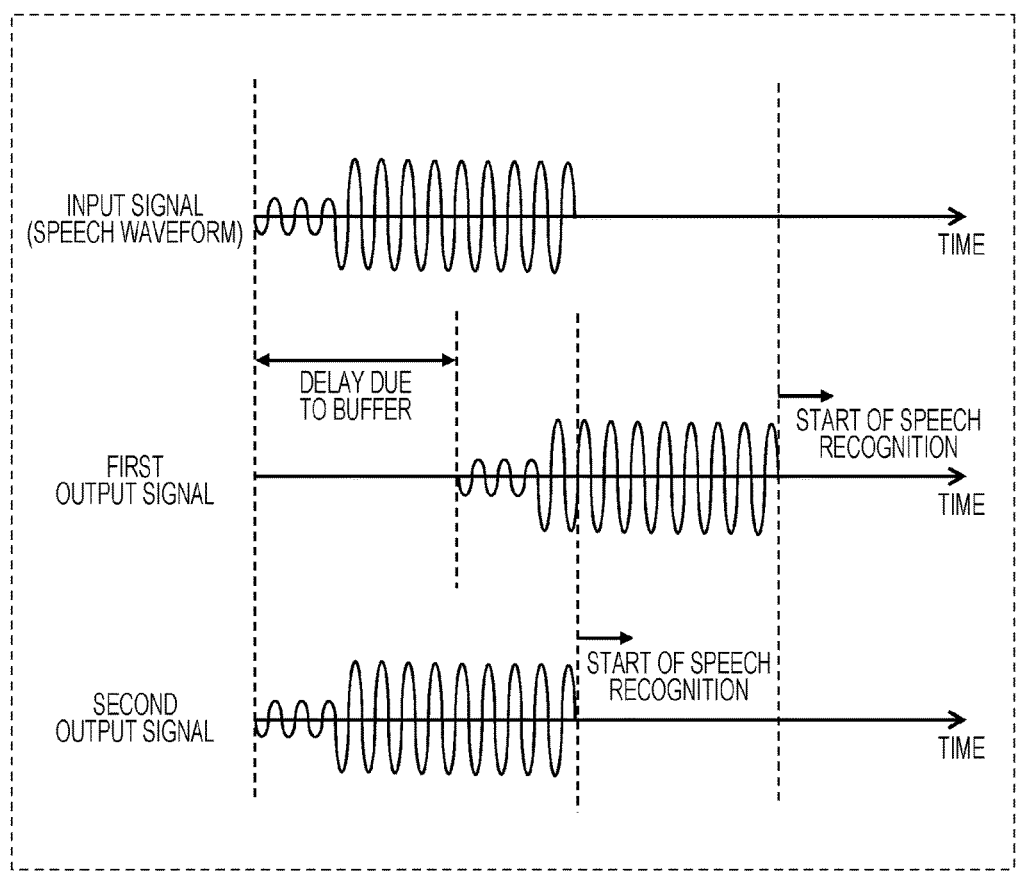
FIG. 14 is a diagram comparing a speech waveform input into a microphone, a waveform of a first output signal output by a first beamforming processing unit, and a waveform of a second output signal output by a second beamforming processing unit.

For example, an output example of the first output signal and the second output signal is illustrated in FIG. 14. FIG. 14 is a diagram comparing a speech waveform input into the microphone 1, a waveform of the first output signal output by the first beamforming processing unit 17, and a waveform of the second output signal output by the second beamforming processing unit 217. In FIG. 14, the horizontal axis is the time axis. As illustrated in FIG. 14, the output time of the first output signal is greatly delayed over the output time of the second output signal.

The first speech recognition unit 18 and the second speech recognition unit 218 perform speech recognition on the first output signal and the second output signal received from the first beamforming processing unit 17 and the second beamforming processing unit 217, respectively (step S204).

The recognition result selection unit 220 compares the first output signal and the second output signal received from the first beamforming processing unit 17 and the second beamforming processing unit 217, and determines whether or not the second output signal is trustworthy (step S205). In other words, the recognition result selection unit 220 inspects the trustworthiness of the second output signal.

For example, the recognition result selection unit 220 compares the two output signal according to a method like the following. Specifically, for first output signal ya(t) and the second output signal yb(t), the recognition result selection unit 220 extracts the first output signal ya(t) and the second output signal yb(t) corresponding to the same observed signal, and computes the sum of the magnitudes of the respective output signals as in Formulas 13 and 14 below. Furthermore, the recognition result selection unit 220 computes the difference between the two as in Formula 15 below. For example, the same observed signal may be taken to be the observed signal acquired by one microphone 1 at the same time, or may be taken to be multiple observed signals acquired by multiple microphones 1 at the same time.

Sum of $ya(t)=\Sigma|ya(t)|$ (Formula 13)

Sum of $yb(t)=\Sigma|yb(t)|$ (Formula 14)

Difference$=(\Sigma|ya(t)|-\Sigma|yb(t)|)^2$ (Formula 15)

The recognition result selection unit 220 determines that the second output signal is trustworthy if the difference is less than a threshold value. The target from which to extract the first output signal ya(t) and the second output signal yb(t) may be the all of the output waveforms of the first output signal and the second output signal illustrated in FIG. 14, or a part of the output waveforms. In the case of a part of the output waveforms, the same segment in the output waveforms is selected as the target.

If the second output signal is trustworthy (step S205, Yes), the recognition result selection unit 220 outputs the speech recognition result for the second output signal (step S206). Consequently, the speech recognition process by the first beamforming processing unit 17 and the first speech recognition unit 18 stops, while the speech recognition process by the second beamforming processing unit 217 and the second speech recognition unit 218 continues. This process is continued until the next change in the estimated direction of speech. After the next change in the estimated direction of speech, the speech recognition process by the first beamforming processing unit 17 and the first speech recognition unit 18 is resumed, and the processes from steps S202 to S205 are performed again.

If the second output signal is not trustworthy (step S205, No), the recognition result selection unit 220 outputs the speech recognition result for the first output signal (step S207). Consequently, the speech recognition process by the second beamforming processing unit 217 and the second speech recognition unit 218 stops, while the speech recognition process by the first beamforming processing unit 17 and the first speech recognition unit 18 continues. This process is continued until the next change in the estimated direction of speech. After the next change in the estimated direction of speech, the speech recognition process by the second beamforming processing unit 217 and the second speech recognition unit 218 is resumed, and the processes from steps S201 to S205 are performed again.

The speech recognition apparatus 200, by outputting the second output signal if the second output signal is trustworthy when the estimated direction of speech changes, reduces the delay time of output compared to the case of outputting the first output signal, and thus speech recognition may be started earlier. Consequently, a speech recognition result is obtained earlier, and the speech recognition response improves.

Advantageous Effects

As discussed above, the speech recognition apparatus 100 according to Embodiment recognizes speech from sound information acquired by multiple microphones 1. The speech recognition apparatus 100 is provided with: a sound information acquisition unit 10 that acquires sound information from the multiple microphones 1; a sound source activity detection unit 11 that detects a sound source interval including sound from the sound information; a direction estimation unit 12 that acquires by direction estimation an estimated direction of a speech interval from among the sound source interval; an adaptation processing unit 13 that performs an adaptation process of using the sound information to estimate filter coefficients for extracting speech in the estimated direction; an adaptation process convergence monitoring unit 14 that acquires information about the convergence state of the adaptation process; a buffer 16 that holds sound information according to a decided buffer size; a buffer size decision unit 15 that decides the buffer size of sound information to hold in the buffer 16, based on the sound source interval information, estimated direction information, and adaptation process convergence state information; a beamforming processing unit 17 that uses the sound information held in the buffer 16 and the filter coefficients to perform a beamforming process and acquire speech information; and a speech recognition unit 18 that performs speech recognition on the speech information obtained by the beamforming process. The buffer size decision unit 15 decides, as the buffer size to hold in the buffer 16, a buffer size of a size sufficient for the convergence of the adaptation process immediately after starting the processing of sound information.

In the configuration discussed above, the buffer size decision unit 15 decides, as the buffer size to hold in the buffer 16, a buffer size of a size sufficient for the convergence of the adaptation process immediately after starting the processing of sound information. Consequently, the first portion of the sound information is processed using a buffer size sufficient for the convergence of the adaptation process, and thus loss in the speech recognition result of the first portion of the sound information is minimized, and a high-quality speech recognition result is obtained. In other words, the loss of the start of speech is minimized. In the portions other than the first portion of the sound information, the buffer size to hold in the buffer 16 is decided based on the sound source interval information, the estimated direction information, and the adaptation process convergence state information. Consequently, it becomes possible to reduce the buffer size used in the beamforming process. Thus, it becomes possible to speed up the speech recognition response. Consequently, it becomes possible to improve the speech recognition response while also minimizing the loss of the start of speech. Note that the first portion of the sound information may be the sound information when a speakers begins to speak, or the sound information immediately after the speech direction of the speaker changes due to the speaker changing, moving, or the like.

A speech recognition method according to Embodiment 1 includes: (a1) acquiring sound information via the plurality of microphones 1; (a2) detecting a sound source interval including sound from the acquired sound information; (a3) acquiring an estimated direction of speech by conducting direction estimation on a speech interval from among the detected sound source interval; (a4) conducting an adaptation process that uses the acquired sound information to estimate filter coefficients for extracting speech information in the estimated direction; (a5) deciding a buffer size of the sound information to hold in the buffer 16, based on information about the sound source interval, information about the estimated direction, and information about a convergence state of the adaptation process; (a6) holding the acquired sound information in the buffer 16 according to the decided buffer size; (a7) conducting a beamforming process using the sound information held in the buffer 16 and the filter coefficients estimated by the adaptation process, and acquiring speech information; and (a8) conducting speech recognition on the speech information acquired by the beamforming process. In the deciding (a5), immediately after processing of the acquired sound information starts, the speech recognition method decides a buffer size of a size sufficient for the convergence of the adaptation process as the buffer size to hold in the buffer. For example, holding sound information in the buffer according to the buffer size may include at least one of securing sound information equal to the buffer size among sound information accumulated in the buffer, and freeing up memory corresponding to sound information equal to the buffer size in the buffer accumulating sound information. According to the above method, advantageous effects similar to the speech recognition apparatus 100 according to Embodiment 1 are obtained.

In the speech recognition method according to Embodiment 1, in the deciding (a5), the buffer size is reverted to an initial value if the information about the estimated direction of speech has changed from previously acquired information about the estimated direction of speech. According to the above method, when the estimated direction of speech changes, the buffer size is reverted to an initial value. For example, the initial value may be taken to be the buffer size immediately after the processing of the sound information starts. Consequently, even if the estimated direction of speech changes, a high-quality speech recognition result with minimal loss of the start of speech is obtained. The buffer size decision unit 15 of the speech recognition apparatus 100 may also perform the above process.

In the speech recognition method according to Embodiment 1, in the deciding (a5), the buffer size is decreased if the information about the estimated direction of speech has not changed from the previously acquired information about the estimated direction of speech, and the information about the detected sound source interval is information about a non-speech interval in a state in which the adaptation process has converged. According to the above method, it is possible to reduce the amount of processing on sound information in a non-speech interval. Furthermore, since the estimated direction is constant, and the adaptation process has converged, influences such as a reduction of the buffer size causing a slowdown in the speed of each process may be reduced. Thus, it becomes possible to improve the speed of the speech recognition process. The buffer size decision unit 15 of the speech recognition apparatus 100 may also perform the above process.

In the speech recognition method according to Embodiment 1, in the deciding (a5), the buffer size is decreased if the information about the estimated direction of speech has not changed from the previously acquired information about the estimated direction of speech, the information about the detected sound source interval is information about a non-speech interval in a state in which the adaptation process has converged, and the current buffer size is greater than a preset lower limit value. According to the above method, the buffer size is prevented from becoming a small size less than or equal to a lower limit value. If the buffer size is too small, the accuracy of the speech recognition process is lowered. Also, if the buffer size is too small, when the information of a detected sound source interval changes to information of a speech interval, it is necessary to perform the speech recognition process after increasing the buffer size. Thus, the response of the process is lowered. By keeping the buffer size over the lower limit value, lowering of the accuracy and response of the speech recognition process is minimized. The buffer size decision unit 15 of the speech recognition apparatus 100 may also perform the above process.

In the speech recognition method according to Embodiment 1, in the deciding (a5), the buffer size is not changed if the information about the estimated direction of speech has not changed from the previously acquired information about the estimated direction of speech, and the adaptation process has not converged. According to the above method, a lowering of the processing speed of the adaptation process and an increase in the time taken for the adaptation process to converge are minimized. The buffer size decision unit 15 of the speech recognition apparatus 100 may also perform the above process.

In the speech recognition method according to Embodiment 1, in the deciding (a5), the buffer size is not changed if the information about the estimated direction of speech has not changed from the previously acquired information about the estimated direction of speech, the adaptation process has converged, and the information about the detected sound source interval is information about a speech interval. In the above process, a certain degree of buffer size is required to obtain a clear and high-quality speech recognition result for the information in the speech interval. By not changing the buffer size, the accuracy of the speech recognition process that has been performed thus far is maintained. The buffer size decision unit 15 of the speech recognition apparatus 100 may also perform the above process.

The speech recognition method according to Embodiment 2 includes, in addition to the method according to Embodiment 1: (b1) holding the filter coefficients estimated by the adaptation process; (b2) conducting a beamforming process using the held filter coefficients, and acquiring speech information; (b3) conducting speech recognition on the speech information acquired in (b2); (b4) if the estimated direction has changed, acquiring speech information on which the beamforming process has been conducted by executing (a1) to (a7) on the sound information acquired after the estimated direction changed; (b5) judging whether a speech recognition result from (b3) is trustworthy by using the speech information acquired in (b2) and the speech information acquired in (b4); and (b6) if judged to be trustworthy in (b5), outputting the speech recognition result from (b3), whereas if judged not to be trustworthy, outputting a speech recognition result obtained by conducting speech recognition on the speech information acquired in (b4).

In the above process, when comparing the process (b2) and the process (b4), the speech recognition process using the process (b2) realizes faster response than the speech recognition process using the process (b4). By conducting the speech recognition process using the process (b2) when that process is trustworthy, it becomes possible to speed up the response of the speech recognition process without lowering the accuracy of the speech recognition process. A component such as the recognition result selection unit 220 of the speech recognition apparatus 200 may also perform the above process.

Note that the above methods may also be realized by a circuit such as an MPU, CPU, processor, or LSI chip, by an IC card, or by a separate module.

In addition, the processes according to the embodiments may also be realized by a software program or a digital signal made up of a software program. For example, the processes according to the embodiments are realized by a program like the following.

Namely, the program is a program causing a computer to execute processing comprising: (c1) acquiring sound information from the plurality of microphones 1; (c2) detecting a sound source interval including sound from the sound information; (c3) acquiring by direction estimation an estimated direction of a speech interval from among the sound source interval; (c4) estimating, by an adaptation process using the sound information, filter coefficients for extracting speech information in the estimated direction; (c5) deciding a buffer size of the sound information to hold in the buffer 16, based on information about the sound source interval, information about the estimated direction, and information about a convergence state of the adaptation process; (c6) holding the sound information in the buffer 16 according to the decided buffer size; (c7) conducting a beamforming process using the sound information held in the buffer 16 and the filter coefficients, and acquiring speech information; and (c8) conducting speech recognition on the speech information acquired by the beamforming process. Furthermore, immediately after processing of the sound information starts, the program holds the sound information of a size sufficient for the convergence of the adaptation process in the buffer. According to the above program, advantageous effects similar to the speech recognition apparatus 100 and the speech recognition method according to Embodiment 1 are obtained.

Note that the program and the digital signal made up of the program may also be realized by recording the computer program or the digital signal onto a computer-readable recording medium, such as a flexible disk, hard disk, CD-ROM, MO, DVD, DVD-ROM, DVD-RAM, Blu-ray (registered trademark) Disc (BD), or semiconductor memory, for example.

In addition, the program and the digital signal made up of the program may also be realized by transmitting the computer program or the digital signal over an electrical communication link, a wired or wireless communication link, a network such as the Internet, or a data broadcast.

In addition, the program and the digital signal made up of the program may also be carried out by another independent computer system by recording and transporting the program or the digital signal on a recording medium, or transporting the program or the digital signal over a network or the like.

As discussed above, these general or specific aspects of the present disclosure may also be realized by a system, method, integrated circuit, computer program, or computer-readable recording medium such as a CD-ROM disc. Additionally, these general or specific aspects of the present disclosure may also be realized by an arbitrary combination of a system, method, integrated circuit, computer program, and recording medium.

The above thus describes embodiments as illustrative examples of the technology disclosed in the present application. However, the technology according to the present disclosure is not limited thereto, and is also applicable to modifications of the embodiments or other embodiments obtained by the appropriate modification, substitution, addition, or removal of elements. In addition, the respective structural elements described in the embodiments and modifications may also be combined to form a new embodiment or modification.

The speech recognition apparatus 100 and 200 according to the embodiments are not equipped with the microphones 1, but may also be configured to include the microphones 1, and furthermore may also be equipped with image capturing means such as a camera, and a processing unit that processes captured images. For example, the speech recognition process may also be configured to combine and output a speech recognition result of the speaker and a captured image obtained by the camera. Furthermore, the speech recognition apparatus or an apparatus such as a robot equipped with the speech recognition apparatus may be configured to recognize persons by cross-referencing a speech recognition result of the speaker with an image recognition result of the speaker from a captured image.

The technology of the present disclosure is usable as a speech recognition apparatus or the like in various equipment that performs speech recognition using a microphone, such as a television that includes a hands-free voice operation function, an interactive robot, a mobile terminal, or a wearable terminal in which the user does not have to be aware of the position of the microphone.

What is claimed is:

1. A speech recognition method that recognizes speech from sound information acquired by a plurality of microphones, comprising:
   (a1) acquiring sound information via the plurality of microphones;
   (a2) detecting a sound source interval including sound from the acquired sound information;
   (a3) estimating a direction of a speaker who uttered a speech based on information including the speech in a speech interval from among the detected sound source interval, wherein the speech is included in the sound information, and acquiring information indicating the estimated direction of the speaker;
   (a4) conducting an adaptation process that uses the acquired sound information to estimate filter coefficients for extracting speech information in the estimated direction of the speaker;
   (a5) deciding a buffer size of the sound information to hold in a buffer, based on information about the sound source interval, the information indicating the estimated direction of the speaker, and information about a convergence state of the adaptation process;
   (a6) holding the acquired sound information in the buffer according to the decided buffer size;
   (a7) conducting a beamforming process using the sound information held in the buffer and the filter coefficients estimated by the adaptation process, and acquiring speech information; and
   (a8) conducting speech recognition on the speech information acquired by the beamforming process,
   wherein in the deciding (a5), immediately after processing of the acquired sound information starts, a buffer size of a size sufficient for the convergence of the adaptation process is decided as the buffer size to hold in the buffer, and
   wherein in the deciding (a5), the buffer size is reverted to an initial value if the information indicating the estimated direction of the speaker has changed from previously acquired information indicating the previously estimated direction of the speaker.

2. The speech recognition method according to claim 1, wherein in the deciding (a5), the buffer size is decreased if the information indicating the estimated direction of the speaker has not changed from the previously acquired information indicating the previously estimated direction of the speaker, and the information about the detected sound source interval is information about a non-speech interval in a state in which the adaptation process has converged.

3. The speech recognition method according to claim 1, wherein in the deciding (a5), the buffer size is decreased if the information indicating the estimated direction of the speaker has not changed from the previously acquired information indicating the previously estimated direction of the speaker, the information about the detected sound source interval is information about a non-speech interval in a state in which the adaptation process has converged, and the current buffer size is greater than a preset lower limit value.

4. The speech recognition method according to claim 1, wherein in the deciding (a5), the buffer size is not changed if the information indicating the estimated direction of the speaker has not changed from the previously acquired information indicating the previously estimated direction of the speaker, and the adaptation process has not converged.

5. The speech recognition method according to claim 1, wherein in the deciding (a5), the buffer size is not changed if the information indicating the estimated direction of the speaker has not changed from the previously acquired information indicating the previously estimated direction of the speaker, the adaptation process has converged, and the information about the detected sound source interval is information about a speech interval.

6. The speech recognition method according to claim 1, further comprising:
   (b1) holding the filter coefficients estimated by the adaptation process;
   (b2) conducting a beamforming process using the held filter coefficients, and acquiring speech information;
   (b3) conducting speech recognition on the speech information acquired in (b2);
   (b4) if the estimated direction of the speaker has changed, acquiring speech information on which the beamforming process has been conducted by executing (a1) to (a7) on the sound information acquired after the estimated direction changed;

(b5) judging whether a speech recognition result from (b3) is trustworthy by using the speech information acquired in (b2) and the speech information acquired in (b4); and (b6) if judged to be trustworthy in (b5), outputting the speech recognition result from (b3), whereas if judged not to be trustworthy, outputting a speech recognition result obtained by conducting speech recognition on the speech information acquired in (b4).

7. A speech recognition apparatus that recognizes speech from sound information acquired by a plurality of microphones, comprising:

a sound information acquirer that acquires sound information from the plurality of microphones;

a sound source interval detector that detects a sound source interval including sound from the sound information;

a direction estimator that estimates a direction of a speaker who uttered a speech based on information including the speech in a speech interval from among the detected sound source interval and that acquires information indicating the estimated direction of the speaker, wherein the speech is included in the sound information;

an adaptation processor that conducts an adaptation process of using the sound information to estimate filter coefficients for extracting speech in the estimated direction of the speaker;

an adaptation process convergence monitor that acquires information about a convergence state of the adaptation process;

a buffer that holds the sound information according to a decided buffer size;

a buffer size decider that decides the buffer size of the sound information to hold in the buffer, based on information about the sound source interval, the information indicating the estimated direction of the speaker, and information about the convergence state of the adaptation process;

a beamforming processor that conducts a beamforming process using the sound information held in the buffer and the filter coefficients, and acquires speech information; and a speech recognizer that conducts speech recognition on the speech information acquired by the beamforming process, wherein immediately after processing of the sound information starts, the buffer size decider decides a buffer size of a size sufficient for the convergence of the adaptation process as the buffer size to hold in the buffer, and wherein the buffer size decider reverts the buffer size to an initial value when the information indicating the estimated direction of the speaker has changed from previously acquired information indicating the previously estimated direction of the speaker.

8. A non-transitory computer-readable recording medium storing a program, the program causing a computer to execute processing comprising:

(c1) acquiring sound information from a plurality of microphones;

(c2) detecting a sound source interval including sound from the sound information;

(c3) estimating a direction of a speaker who uttered a speech based on information including the speech in a speech interval from among the detected sound source interval, wherein the speech is included in the sound information, and acquiring information indicating the estimated direction of the speaker;

(c4) estimating, by an adaptation process using the sound information, filter coefficients for extracting speech information in the estimated direction of the speaker;

(c5) deciding a buffer size of the sound information to hold in a buffer, based on information about the sound source interval, information about the estimated direction, and information about a convergence state of the adaptation process;

(c6) holding the sound information in the buffer according to the decided buffer size;

(c7) conducting a beamforming process using the sound information held in the buffer and the filter coefficients, and acquiring speech information; and (c8) conducting speech recognition on the speech information acquired by the beamforming process, wherein immediately after processing of the sound information starts, the sound information of a size sufficient for the convergence of the adaptation process is held in the buffer, and wherein in the deciding (c5), the buffer size is reverted to an initial value if the information indicating the estimated direction of the speaker has changed from previously acquired information indicating the previously estimated direction of the speaker.

9. A speech recognition method that recognizes speech from sound information acquired by a plurality of microphones, comprising:

(a1) acquiring sound information via the plurality of microphones;

(a2) detecting a sound source interval including sound from the acquired sound information;

(a3) estimating a direction of a speaker who uttered a speech based on information including the speech in a speech interval from among the detected sound source interval, wherein the speech is included in the sound information, and acquiring information indicating the estimated direction of the speaker;

(a4) conducting an adaptation process that uses the acquired sound information to estimate filter coefficients for extracting speech information in the estimated direction of the speaker;

(a5) deciding a buffer size of the sound information to hold in a buffer, based on information about the sound source interval, the information indicating the estimated direction of the speaker, and information about a convergence state of the adaptation process;

(a6) holding the acquired sound information in the buffer according to the decided buffer size;

(a7) conducting a beamforming process using the sound information held in the buffer and the filter coefficients estimated by the adaptation process, and acquiring speech information; and (a8) conducting speech recognition on the speech information acquired by the beamforming process, wherein in the deciding (a5), immediately after processing of the acquired sound information starts, a buffer size of a size sufficient for the convergence of the adaptation process is decided as the buffer size to hold in the buffer, and wherein the holding of the sound information in the buffer according to the buffer size includes at least one of securing sound information equal to the buffer size among sound information accumulated in the buffer, and freeing up memory corresponding to sound information equal to the buffer size in the buffer accumulating sound information.

\* \* \* \* \*